US012112689B2

(12) United States Patent
Li et al.

(10) Patent No.: US 12,112,689 B2
(45) Date of Patent: Oct. 8, 2024

(54) DISPLAY PANEL, DRIVING METHOD, AND DISPLAY DEVICE

(71) Applicant: Xiamen Tianma Micro-Electronics Co., Ltd., Xiamen (CN)

(72) Inventors: Jieliang Li, Xiamen (CN); Jiaxian Liu, Shanghai (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 18/071,449

(22) Filed: Nov. 29, 2022

(65) Prior Publication Data

US 2023/0089780 A1 Mar. 23, 2023

Related U.S. Application Data

(63) Continuation of application No. 17/166,290, filed on Feb. 3, 2021, now Pat. No. 11,538,399.

(30) Foreign Application Priority Data

Oct. 20, 2020 (CN) ......................... 202011126177.8

(51) Int. Cl.
*G09G 3/32* (2016.01)
*G09G 3/20* (2006.01)
*G09G 3/3233* (2016.01)

(52) U.S. Cl.
CPC ............. *G09G 3/32* (2013.01); *G09G 3/2092* (2013.01); *G09G 3/3233* (2013.01); *G09G 2310/0278* (2013.01); *G09G 2320/043* (2013.01)

(58) Field of Classification Search
CPC ...... G09G 3/32; G09G 3/2092; G09G 3/3233; G09G 2310/0278; G09G 2320/043
See application file for complete search history.

(56) References Cited

U.S. PATENT DOCUMENTS

| | | | | |
|---|---|---|---|---|
| 9,786,224 | B2 | 10/2017 | Kim et al. | |
| 9,947,269 | B2 | 4/2018 | Jung et al. | |
| 10,242,620 | B2 | 3/2019 | Zhu et al. | |
| 10,777,128 | B2 | 9/2020 | Feng et al. | |
| 11,018,167 | B2 | 5/2021 | Zhao et al. | |
| 11,049,458 | B1 * | 6/2021 | Fan | G09G 3/3266 |

(Continued)

FOREIGN PATENT DOCUMENTS

| | | | |
|---|---|---|---|
| CN | 109285500 | A | 1/2019 |
| CN | 109493806 | A | 3/2019 |

*Primary Examiner* — Michael J Jansen, II
(74) *Attorney, Agent, or Firm* — Anova Law Group, PLLC

(57) ABSTRACT

A display panel includes a pixel circuit and a light-emitting element. The pixel circuit includes a data-writing module, a driving module, and a compensation module. The driving module is configured to provide a driving current for the light-emitting element, wherein the driving module includes a driving transistor, and the driving transistor is an NMOS transistor. The data-writing module is configured to selectively provide a data signal for the driving module. The compensation module is configured to compensate a threshold voltage of the driving transistor. An operational process of the pixel circuit includes a bias stage. In the bias stage, the compensation module is turned off, the driving transistor receives a bias signal, and the bias signal is configured to adjust a bias state of the driving transistor.

7 Claims, 22 Drawing Sheets

(56) References Cited

U.S. PATENT DOCUMENTS

| | | | | |
|---|---|---|---|---|
| 11,309,373 | B2 * | 4/2022 | Kim | H10K 59/1213 |
| 11,393,399 | B2 | 7/2022 | Na | |
| 11,410,602 | B2 | 8/2022 | Kim et al. | |
| 11,411,122 | B2 * | 8/2022 | Lee | H01L 27/124 |
| 11,538,399 | B2 * | 12/2022 | Li | G09G 3/32 |
| 11,580,906 | B2 * | 2/2023 | Wang | G09G 3/2003 |
| 2006/0055336 | A1 * | 3/2006 | Jeong | G09G 3/3233 315/169.3 |
| 2011/0157125 | A1 * | 6/2011 | Choi | G09G 3/3233 315/160 |
| 2012/0001896 | A1 * | 1/2012 | Han | G09G 3/3233 345/76 |
| 2013/0002632 | A1 * | 1/2013 | Choi | G09G 3/325 345/76 |
| 2014/0210867 | A1 * | 7/2014 | Kwon | G09G 3/3233 257/40 |
| 2015/0170576 | A1 * | 6/2015 | Bae | G09G 3/3266 345/82 |
| 2016/0133190 | A1 | 5/2016 | Kim et al. | |
| 2016/0314742 | A1 * | 10/2016 | Zhou | G09G 3/3258 |
| 2016/0351122 | A1 | 12/2016 | Jung et al. | |
| 2017/0033171 | A1 * | 2/2017 | Kim | G09G 3/3233 |
| 2017/0316737 | A1 * | 11/2017 | Park | G09G 3/3208 |
| 2017/0316739 | A1 * | 11/2017 | Oh | G09G 3/3283 |
| 2018/0040682 | A1 * | 2/2018 | Ebisuno | H10K 59/1213 |
| 2018/0069069 | A1 * | 3/2018 | Ebisuno | H10K 59/352 |
| 2018/0158406 | A1 * | 6/2018 | Kim | G09G 3/3283 |
| 2018/0166516 | A1 * | 6/2018 | Chai | H10K 59/131 |
| 2018/0190194 | A1 | 7/2018 | Zhu et al. | |
| 2018/0342195 | A1 * | 11/2018 | Zhou | G09G 3/22 |
| 2019/0006390 | A1 * | 1/2019 | Park | H01L 29/41733 |
| 2019/0066598 | A1 * | 2/2019 | Kim | G09G 3/3233 |
| 2019/0164476 | A1 | 5/2019 | Feng et al. | |
| 2019/0189651 | A1 | 6/2019 | Zhao et al. | |
| 2019/0206320 | A1 * | 7/2019 | Nam | G09G 3/3258 |
| 2019/0259822 | A1 * | 8/2019 | Jeon | H01L 27/1218 |
| 2020/0135110 | A1 * | 4/2020 | Yokoyama | G09G 3/3266 |
| 2020/0211448 | A1 * | 7/2020 | Zhou | G09G 3/32 |
| 2020/0365677 | A1 * | 11/2020 | Yun | H01L 29/78645 |
| 2021/0043709 | A1 * | 2/2021 | Kim | G09G 3/3266 |
| 2021/0118368 | A1 * | 4/2021 | In | G09G 3/3275 |
| 2021/0210014 | A1 | 7/2021 | Kim et al. | |
| 2021/0280130 | A1 | 9/2021 | Wang et al. | |
| 2021/0304672 | A1 * | 9/2021 | Kim | H10K 59/1213 |
| 2021/0305340 | A1 * | 9/2021 | Kim | H10K 50/00 |
| 2021/0312856 | A1 * | 10/2021 | Jeong | G09G 5/18 |
| 2021/0319747 | A1 * | 10/2021 | Jeon | G09G 3/3233 |
| 2021/0366397 | A1 | 11/2021 | Na | |
| 2021/0408061 | A1 * | 12/2021 | Shin | G09G 3/3233 |
| 2022/0044635 | A1 * | 2/2022 | Roh | G09G 3/3258 |
| 2022/0084464 | A1 * | 3/2022 | Lee | H10K 59/131 |
| 2022/0122522 | A1 * | 4/2022 | Li | G09G 3/2092 |
| 2022/0130322 | A1 * | 4/2022 | Yuan | G09G 3/3233 |
| 2022/0238070 | A1 * | 7/2022 | Kim | G09G 3/3208 |
| 2022/0343844 | A1 * | 10/2022 | Song | G09G 3/3233 |
| 2022/0375408 | A1 * | 11/2022 | Dong | G09G 3/3241 |
| 2023/0089780 | A1 * | 3/2023 | Li | G09G 3/3233 |
| 2023/0091203 | A1 * | 3/2023 | Li | G09G 3/32 |
| 2023/0130200 | A1 * | 4/2023 | Kim | G09G 3/3241 345/204 |

* cited by examiner

DISPLAY PANEL, DRIVING METHOD, AND DISPLAY DEVICE

CROSS-REFERENCE TO RELATED APPLICATION

This application is a continuation of U.S. patent application Ser. No. 17/166,290, filed on Feb. 3, 2021, which claims priority of Chinese Patent Application No. 202011126177.8, filed on Oct. 20, 2020, the entire contents of both of which are hereby incorporated by reference.

FIELD OF THE DISCLOSURE

The present disclosure generally relates to the field of display technology and, more particularly, relates to a display panel, a driving method, and a display device.

BACKGROUND

In a display panel, a pixel circuit provides driving current required for display to a light-emitting element of the display panel, and controls whether the light-emitting element enters a light-emitting stage. Accordingly, a pixel circuit becomes an indispensable element in most of self-luminous display panels.

However, in a current display panel, as usage time increases, internal characteristics of a driving transistor in a pixel circuit may change. Accordingly, a threshold voltage of the driving transistor may drift, and overall characteristics of the driving transistor may thus be affected. As a result, display uniformity of the display panel may be affected.

The disclosed structures and methods are directed to solve one or more problems set forth above and other problems in the art.

SUMMARY

One aspect of the present disclosure includes a display panel. The display panel includes a pixel circuit and a light-emitting element. The pixel circuit includes a data-writing module, a driving module, and a compensation module. The driving module is configured to provide a driving current for the light-emitting element, wherein the driving module includes a driving transistor, and the driving transistor is an NMOS transistor. The data-writing module is configured to selectively provide a data signal for the driving module. The compensation module is configured to compensate a threshold voltage of the driving transistor. An operational process of the pixel circuit includes a bias stage. In the bias stage, the compensation module is turned off, the driving transistor receives a bias signal, and the bias signal is configured to adjust a bias state of the driving transistor.

Another aspect of the present disclosure includes a method of driving a display panel. The display panel includes a pixel circuit and a light-emitting element. The pixel circuit includes a data-writing module, a driving module, and a compensation module. The driving module is configured to provide a driving current for the light-emitting element, wherein the driving module includes a driving transistor, and the driving transistor is an NMOS transistor. The data-writing module is configured to selectively provide a data signal for the driving module. The compensation module is configured to compensate a threshold voltage of the driving transistor. An operational process of the pixel circuit includes a bias stage. In the bias stage, the compensation module is turned off, the driving transistor receives a bias signal, and the bias signal is configured to adjust a bias state of the driving transistor.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present disclosure clearer and more explicit, the present disclosure is described in further detail with accompanying drawings and embodiments. It should be understood that the specific exemplary embodiments described herein are only for explaining the present disclosure and are not intended to limit the present disclosure.

Reference will now be made in detail to exemplary embodiments of the present disclosure, which are illustrated in the accompanying drawings. Wherever possible, the same reference numbers will be used throughout the drawings to refer to the same or like parts.

It should be noted that relative arrangements of components and steps, numerical expressions and numerical values set forth in exemplary embodiments are for illustration purpose only and are not intended to limit the present disclosure unless otherwise specified. Techniques, methods and apparatus known to the skilled in the relevant art may not be discussed in detail, but these techniques, methods and apparatus should be considered as a part of the specification, where appropriate.

It should be noted that in the present disclosure, relational terms such as "first" and "second" are used only to distinguish one entity or operation from another entity or operation, and do not necessarily require or imply any such actual relationship or order between these entities or operations.

Figure 1:
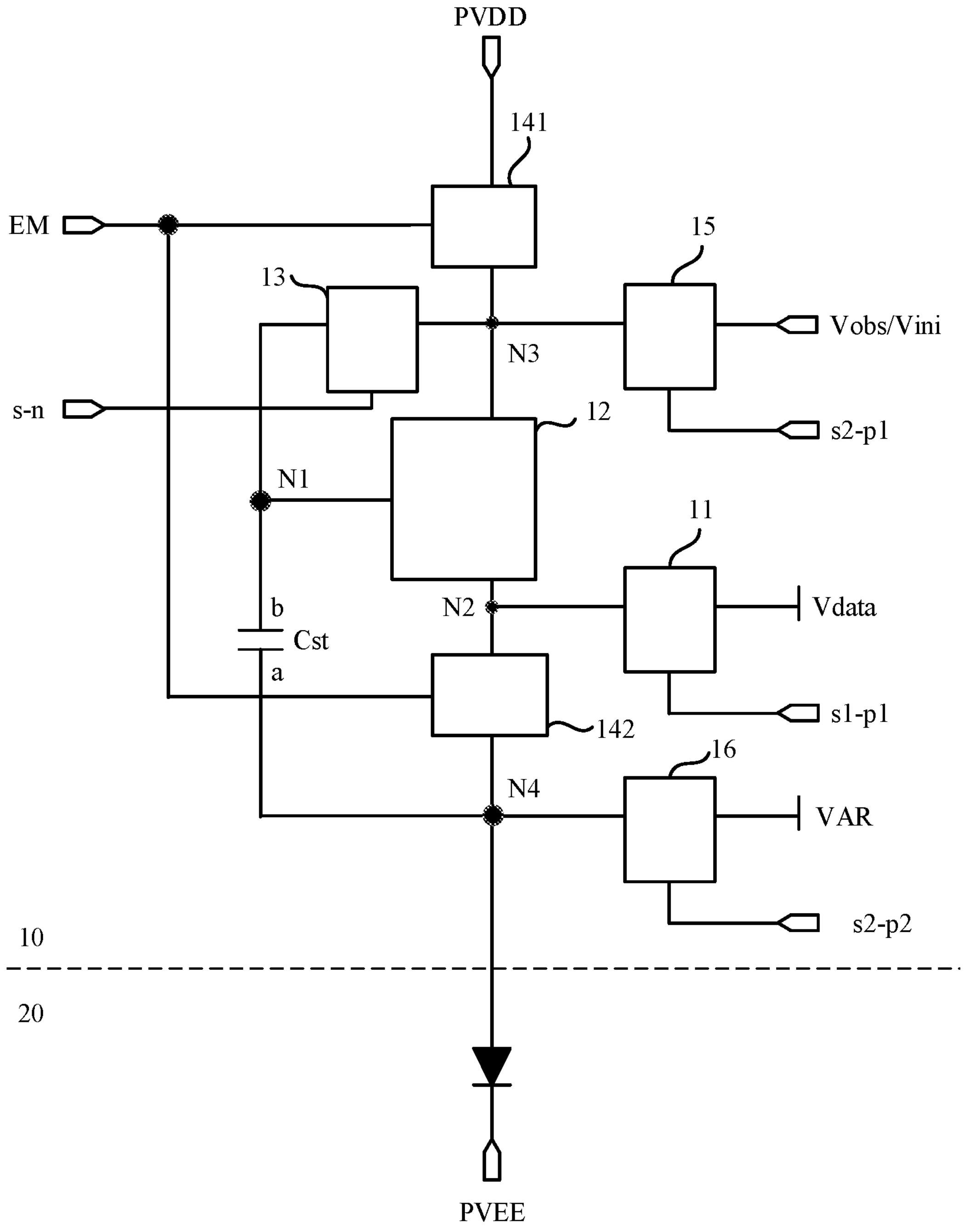
FIG. 1 illustrates a module connection diagram of a pixel circuit of a display panel consistent with the disclosed embodiments of the present disclosure.
Figure 2:
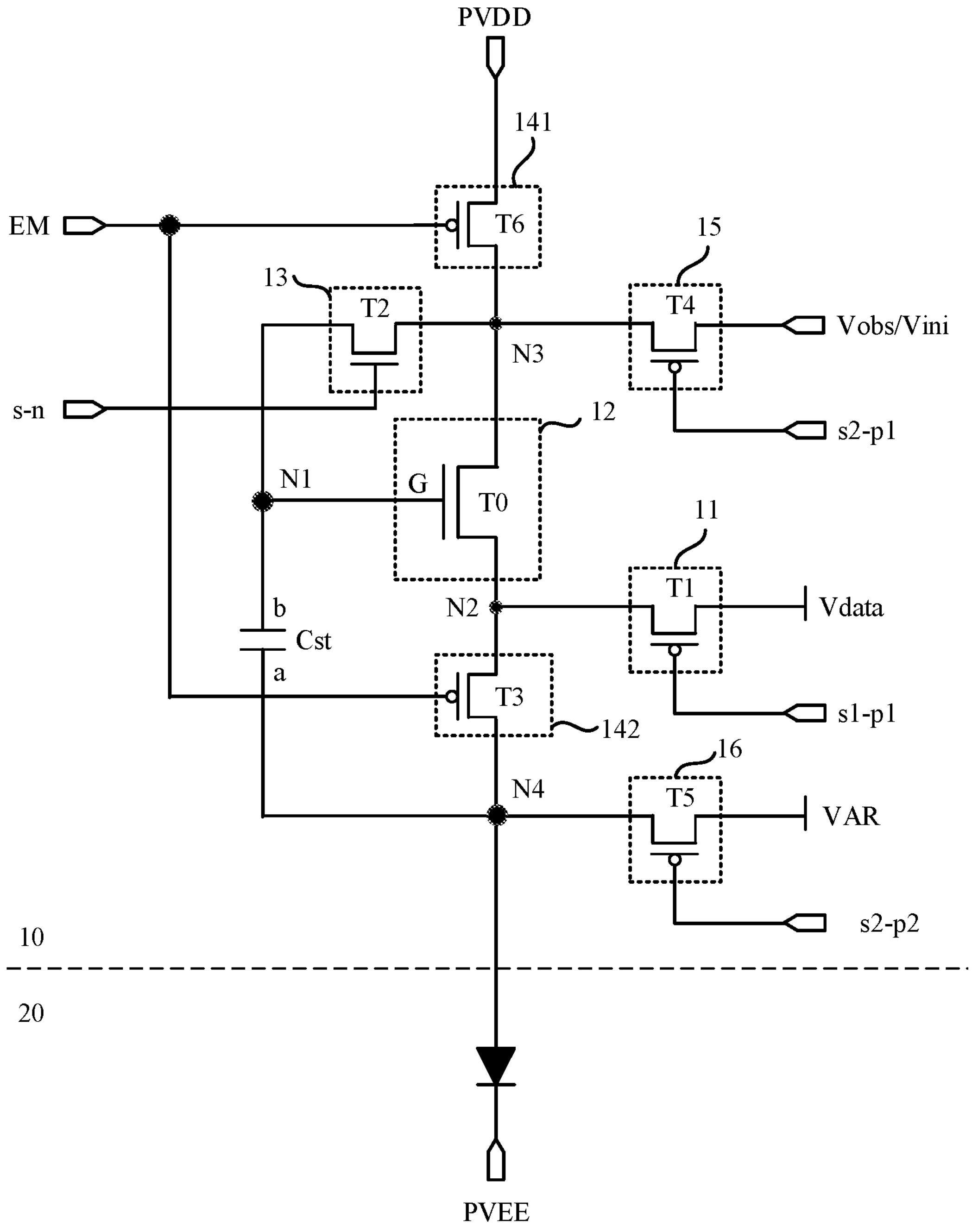
FIG. 2 illustrates a structural diagram of a pixel circuit of a display panel consistent with the disclosed embodiments of the present disclosure.

FIG. 1 illustrates a module connection diagram of a pixel circuit of a display panel consistent with the disclosed embodiments of the present disclosure. FIG. 2 illustrates a structural diagram of a pixel circuit of a display panel consistent with the disclosed embodiments of the present disclosure. With reference to FIG. 1 and FIG. 2, the display panel includes a pixel circuit 10 and a light-emitting element 20. The pixel circuit 10 includes a data-writing module 11, a driving module 12, a compensation module 13, and a first light-emission controller 141. The driving module 12 is configured to provide a driving current for the light-emitting element 20. The driving module 12 includes a driving transistor T0, and the driving transistor T0 is an NMOS transistor. The data-writing module 11 is connected between a data signal input terminal Vdata and a first terminal, that is, the second node N2, of the driving transistor T0, and is configured to selectively provide a data signal to the driving module 12. The compensation module 13 is configured to compensate a threshold voltage of the driving transistor T0. The first light-emission controller 141 is connected between a first power signal terminal PVDD and a second terminal, that is, a third node N3, of the driving transistor T0, and is configured to selectively provide the driving module 12 with a first power signal PVDD. An operational process of the pixel circuit 10 includes a bias stage. In the bias stage, the compensation module 13 is turned off, and the driving transistor T0 may receive a bias signal Vobs. The bias signal Vobs is configured to adjust a bias state of the driving transistor T0.

It should be noted that FIG. 1 and FIG. 2 only illustrate key structures in the pixel circuit, and do not include each structure in the circuit. More detailed structures of the pixel circuit are shown later in the present disclosure.

In one embodiment, an output terminal of the driving module 12 is electrically connected to the light-emitting element 20. A first terminal of the driving module 12 is connected to the second node N2, and a second end of the driving module 12 is connected to the third node N3. A control terminal of the driving module 12 is connected to a first node N1. The driving module 12 includes a driving transistor T0. The first terminal of the driving module 12 is a first terminal of the driving transistor T0, and the second terminal of the driving module 12 is a second terminal of the driving transistor T0. The control terminal of the driving module 12 is a gate of the driving transistor T0. After the driving transistor T0 is turned on, the driving module 12 may provide driving current for the light-emitting element 20. A source of the driving transistor T0 is electrically connected to the first terminal of the driving module 12, and a drain of the driving transistor T0 is electrically connected to the second terminal of the driving module 12. In some other embodiments, the drain of the driving transistor may be electrically connected to the first terminal of the driving module, and the source of the driving transistor may be electrically connected to the second terminal of the driving module. It may be understood that characteristics of the source and the drain of the driving transistor may not be constant, and may change when a driving state of the driving transistor changes.

In one embodiment, the driving transistor T0 may be an oxide semiconductor transistor, and specifically may be an indium gallium zinc oxide (IGZO) semiconductor transistor. An oxide semiconductor transistor may have advantages of high mobility, good uniformity, high transparency, and a simple manufacturing process. Compared with a silicon-based semiconductor transistor, an oxide semiconductor transistor may have better threshold voltage consistency, less leakage, and lower hysteresis. Accordingly, an oxide semiconductor transistor may be more suitable for making a large-size display product.

The compensation module 13 is connected between the gate of the driving transistor T0 and the second terminal of the driving transistor T0, that is, the second node N3. Specifically, a first terminal of the compensation module 13 is electrically connected to the second terminal of the driving module 12 (the third node N3). A control terminal of the compensation module 13 may receive a first scan signal s-n. The second terminal of the compensation module 13 is electrically connected to the control terminal of the driving module 12 (the first node N1).

In one embodiment, the compensation module 13 includes a second transistor T2. The first terminal of the compensation module 13 is a first terminal of the second transistor T2, and the second terminal of the compensation module 13 is a second terminal of the second transistor T2. The first terminal of the second transistor T2 is connected to the second terminal of the driving transistor T0 (the third node N3), the second terminal of the second transistor T2 is connected to the gate of the driving transistor T0 (the first node N1). A gate of the second transistor T2 is configured to receive the first scan signal s-n. The first scan signal s-n received by the pixel circuit 10 is a pulse signal. An effective pulse of the first scan signal s-n may control the transmission path of the first end and the second end of the compensation module 13 to be turned on, such that the voltage between the control terminal and the second terminal of the driving module 12 may be adjusted. An invalid pulse of the first scan signal s-n may control the transmission path of the first terminal and the second terminal of the compensation module 13 to be turned off. Accordingly, the first scan signal s-n may control the compensation module 13 to be turned on, and may be used to compensate a threshold voltage of the driving transistor T0.

In one embodiment, an oxide semiconductor transistor may be used as the second transistor T2. The leakage current of an oxide semiconductor transistor may be relatively small, and thus the potential of the driving transistor may be stabilized.

In one embodiment, a first terminal of the data-writing module 11 receives the data signal Vdata. A second terminal of the data-writing module 11 is connected to the first terminal of the driving module 12. In one embodiment, the data-writing module 11 may include a first transistor T1. A first terminal of the first transistor T1 is configured to receive a data signal Vdata. A second terminal of the first transistor T1 is connected to the first terminal of the driving transistor T0. A gate of the first transistor T1 is configured to receive a second scan signal s1-p1.

In one embodiment, a control terminal of the first light-emission controller 141 may receive a light-emission control signal EM. A first terminal of the first light-emission controller 141 is electrically connected to the second terminal of the driving module 12. A second terminal of the first light-emission controller 141 is connected to a first power signal terminal PVDD.

In one embodiment, the first light-emission controller 141 may include a sixth transistor T6. A first terminal of the sixth transistor T6 is the first terminal of the first light-emission controller 141. A second terminal of the sixth transistor T6 is the second terminal of first light-emission controller 141. The sixth transistor T6 is connected between the first power signal terminal PVDD and the second terminal of the driving transistor T0. A gate of the sixth transistor T6 may receive the light-emission control signal EM. The light-emission control signal EM received by the pixel circuit 10 may be a pulse signal. An effective pulse of the light-emission control signal EM may control a transmission path of the input terminal and the output terminal of the first emission controller 141 to be turned on, that is, the sixth transistor T6 is turned on, such that the first power signal PVDD may be provided to the driving module 12. An invalid pulse of the light-emission control signal EM may control the transmission path of the input terminal and the output terminal of the first emission controller 141 to be turned off, and thus the sixth transistor T6 is turned off. Accordingly, under control of the light-emission control signal EM, the first light-emission controller 141 may selectively provide the first power signal PVDD for the driving module 12.

With continuous reference to FIG. 2, the pixel circuit may also include a second light-emission controller 142 and an initialization module 16. The second light-emission controller 142 is connected between the light-emitting element 20 and the first terminal of the driving transistor T0. The second light-emission controller 142 is configured to selectively allow the driving current to flow into the light-emitting element 20. The initialization module 16 is connected between an initialization signal terminal VAR and the light-emitting element 20. The initialization module 16 is configured to selectively provide an initialization signal for the light-emitting element 20.

In one embodiment, the initialization module 16 may include a fifth transistor T5. A gate of the fifth transistor T5 may receive a fourth scan signal s2-p2. Under control of the fourth scan signal s2-p2, the fifth transistor T5 may be turned on or off. The second light-emission controller 142 may include a third transistor T3. The second light-emission controller 142 is connected between the first terminal of the driving transistor T0 and the light-emitting element 20. A gate of the third transistor T3 receives the light-emission control signal EM. Under control of the light-emission control signal EM, the third transistor T3 may be turned on or off.

Figure 3:
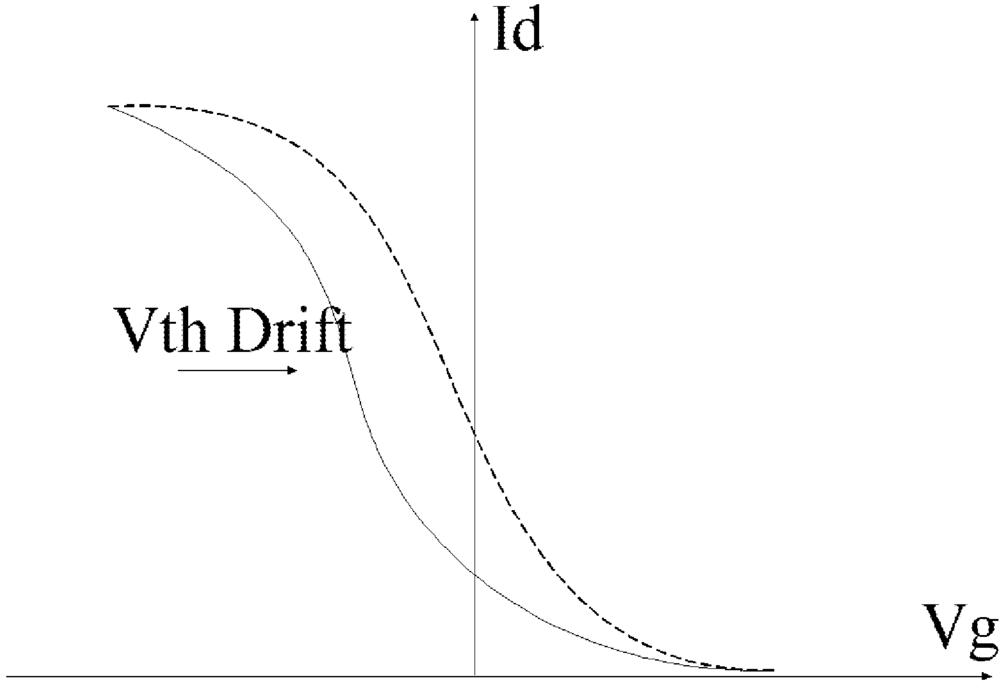
FIG. 3 illustrates a schematic diagram of drift of an Id-Vg curve of a driving transistor, consistent with the disclosed embodiments of the present disclosure.

For an NMOS-type driving transistor, when the pixel circuit is in a non-biased stage such as a light-emitting stage, the driving transistor is in an on state. That is, the gate potential is greater than the source potential, and the potential of the gate of the driving transistor T0, that is, the first node N1, is greater than the potential of the first terminal, that is, the second node N2. When such a setting is kept for a long time, polarization of ions inside the driving transistor may occur, and thus a built-in electric field may be formed inside the driving transistor, resulting in a continuous increase of the threshold voltage of the driving transistor. FIG. 3 illustrates a schematic diagram of drift of an Id-Vg curve of a driving transistor. As shown in FIG. 3, the Id-Vg curve may drift, and the driving current flowing into the light-emitting element may be affected, and thus the display uniformity may be affected.

In one embodiment, a bias stage is added to the operational process of the pixel circuit 10. In the bias stage, the compensation module 13 is turned off. The second terminal of the driving transistor T0, that is, the third node N3, receives the bias signal Vobs. The bias signal Vobs may be set to be lower than the voltage of the first power signal PVDD. At this time, compared with an unbiased stage, the potential of the second terminal of the driving transistor may be reduced to a certain extent during the biased stage. Thus, during the bias stage, the potentials of the gate, source and drain of the driving transistor may be adjusted.

In some embodiments, the potential of the second terminal of the driving transistor may be lower than the potential of the gate, that is, the potential of the third node N3 may be lower than the potential of the first node N1, such that the driving transistor is reversely biased. Thus, the degree of ion polarization inside the driving transistor T0 may be weakened, and the threshold voltage of the driving transistor T0 may be lowered. Accordingly, the threshold voltage of the driving transistor T0 may be adjusted by biasing the driving transistor T0.

In some embodiments, in the bias stage, the potential difference between the gate, source, and drain potentials of the driving transistor T0 may be adjusted. Influence of such a setting on the internal characteristics of the driving transistor T0 may balance the influence on the internal characteristics of the driving transistor when the gate potential of the driving transistor T0 is greater than the source potential in the unbiased stage. That is, the threshold voltage of the driving transistor T0 in the bias stage may be lowered. Accordingly, the increase in the threshold voltage of the driving transistor in the unbiased stage may be balanced, such that the Id-Vg curve may not drift. Thus, the display uniformity of the display panel may be improved.

In one embodiment, the operational process of the pixel circuit may include a bias stage. In the bias stage, the compensation module is turned off, and the driving transistor may receive a bias signal. The bias signal may be used to adjust the bias state of the driving transistor, and may drive the potentials of the gate, source or drain of the driving transistor. The operational process of the pixel circuit may include at least one non-bias stage. When driving current is generated in the driving transistor, the gate potential of the driving transistor may be greater than the source potential of the driving transistor. As a result, the I-V curve of the driving transistor may drift, and the threshold voltage of the driving transistor may shift. In the bias stage, by adjusting the potentials of the gate, source or drain of the driving transistor, the drift of the I-V curve of the driving transistor in the non-bias stage may be balanced. Accordingly, a phenomenon of threshold voltage drift of the driving transistor may be weakened, and the display uniformity of the display panel may be improved.

Figure 4:
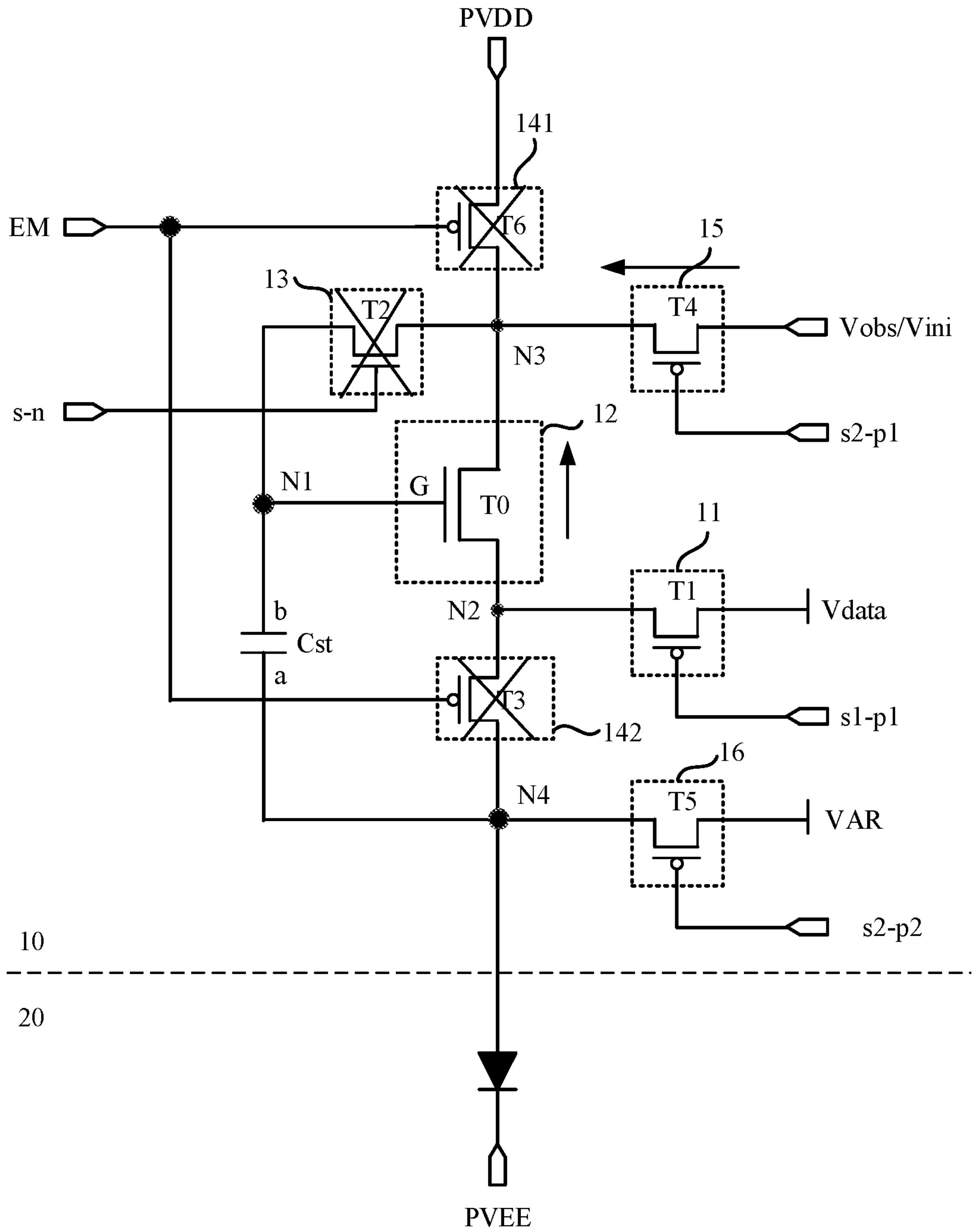
FIG. 4 illustrates an exemplary schematic diagram of a bias stage of the pixel circuit shown in FIG. 1, consistent with the disclosed embodiments of the present disclosure.

In one embodiment, the potential of the second terminal of the driving transistor in the bias stage may be set to be lower than the potential of the control terminal of the driving transistor. FIG. 4 illustrates an exemplary schematic diagram of a bias stage of the pixel circuit shown in FIG. 1. A direction of an arrow is a direction of a signal path. As shown in FIG. 4, in the bias stage, the potential of the second terminal of the driving transistor T0 is lower than the potential of the control terminal of the driving transistor T0. The potential of the third node N3 is lower than the potential of the first node N1, the driving transistor T0 is turned on, and the conduction direction is the direction from the second node N2 to the third node N3. For the pixel circuit in a non-bias stage such as the light-emitting stage, when the driving transistor T0 is turned on, the current direction is from the third node N3 to the second node N2. The potential of the third node N3 may remain greater than the potential of the second node N2, and the potential of the second terminal of the driving transistor may be greater than the potential of the first terminal.

In one embodiment, by setting the bias stage and setting the voltage of the second terminal of the driving transistor lower than the voltage of the control terminal of the driving transistor, the driving transistor may realize reverse bias conduction. For the driving transistor, reverse bias conduction may balance the deviation of the I-V curve in the non-bias stage, and reduce the drift of the threshold voltage of the driving transistor. Accordingly, the stability of the threshold voltage of the driving transistor may be improved. Thus, each pixel circuit in the display panel may be stabilized, and the display uniformity of the display panel may be improved.

It may be understood that, in one embodiment, the operational process of pixel driving further includes at least one non-bias stage. In the bias stage, the voltage of the control terminal of the driving transistor is Vg1, the voltage of the first terminal of the driving transistor is Vs1, and the voltage of the second terminal is Vd1. In the non-bias stage, the voltage of the control terminal of the driving transistor is Vg2, the voltage of the first terminal of the driving transistor is Vs2, and the voltage of the second terminal is Vd2. In one embodiment, $(Vg1-Vd1)\times(Vg2-Vd2)<0$, or $(Vg1-Vs1)\times(Vg2-Vs2)<0$ may be set.

During an operational process of the pixel circuit, when the first power signal PVDD is written into the second terminal of the driving transistor through the first terminal of the driving transistor, the gate voltage and the second terminal voltage of the driving transistor may satisfy $(Vg1-Vd1)\times(Vg2-Vd2)<0$. In the non-bias stage, the gate voltage of the driving transistor in the pixel circuit may be smaller than the second terminal voltage of the driving transistor, that is, $Vg2<Vd2$, and thus $Vg2-Vd2<0$. In the bias stage, the bias voltage is written into the second terminal of the driving transistor. In one embodiment, the bias voltage may be less than the first power signal PVDD, such that the gate voltage of the driving transistor is greater than the second terminal voltage of the driving transistor, that is, $Vg1>Vd1$, and then $Vg1-Vd1>0$. Thus $(Vg1-Vd1)\times(Vg2-Vd2)<0$.

In some other embodiments, during the operational process of the pixel circuit, when the first power signal PVDD is written into the second terminal of the driving transistor through the first terminal of the driving transistor, the gate voltage and the second terminal voltage of the driving transistor satisfy $(Vg1-Vs1)\times(Vg2-Vs2)<0$. In the non-bias stage, the gate voltage of the driving transistor in the pixel circuit is greater than the first terminal voltage of the driving transistor, that is, $Vg2>Vs2$, and then $Vg2-Vs2>0$. In the bias stage, the first power signal PVDD is written into the second terminal of the driving transistor, such that the gate voltage of the driving transistor is smaller than the first terminal voltage of the driving transistor, that is, $Vg1<Vs1$, and then $Vg1-Vs1<0$. Thus $(Vg1-Vs1)\times(Vg2-Vs2)<0$.

In one embodiment, duration of the non-bias stage such as the light-emitting stage of the display panel may be relatively long. To fully balance the threshold voltage drift in the non-bias stage during the bias stage, and to avoid too long duration of the bias stage, $Vd1-Vg1>Vg2-Vd2>0$ may be set. Accordingly, (Vd1−Vg1) of the bias stage may be large enough, such that an expected bias effect may be quickly achieved in the bias stage. In some other embodiments, depending on specific circuit conditions, $Vs1-Vg1>Vg2-Vs2>0$ may be set.

In some other embodiments, the duration of the bias stage is t1, and the duration of the non-bias stage is t2, with $$(|Vg1-Vs1|-|Vg2-Vs2|)\times(t1-t2)<0, \text{ or}$$

$$(|Vg1-Vd1|-|Vg2-Vd2|)\times(t1-t2)<0.$$

In one embodiment, in the non-bias stage, the first power signal PVDD is written into the second terminal of the driving transistor. In some embodiments, the voltage of the second terminal of the driving transistor may be greater than the voltage of the gate of the driving transistor, that is, $Vg1-Vd1<0$. In the bias stage, the gate voltage of the driving transistor may be greater than the voltage of the second terminal of the driving transistor, that is, $Vg2-Vd2>0$. In a process of biasing the driving transistor, when the bias voltage is large, the bias time may be reduced, and when the bias voltage is small, the bias time may be extended.

Based on this, when $|Vg1-Vd1|-|Vg2-Vd2|>0$, the bias voltage may be large. In this case, the duration of the bias stage may be reduced, that is, $t1<t2$, such that the deviation of the threshold voltage between the bias stage and the non-bias stage may be reduced. When $|Vg1-Vd1|-|Vg2-Vd2|<0$, the bias voltage may be small. In this case, the duration of the bias stage may be extended, that is, t1>t2, such that the deviation of the threshold voltage between the bias stage and the non-bias stage may be reduced.

In some other embodiments, in the non-bias stage, the first power signal PVDD is written into the second terminal of the driving transistor. Accordingly, the gate and the second terminal of the driving transistor in the bias stage and the non-bias stage may satisfy $(|Vg1-Vs1|-|Vg2-Vs2|)\times(t1-t2)<0$. The deviation of the threshold voltage between the bias stage and the non-bias stage may thus be reduced.

It may be understood that, in one embodiment, the pixel circuit also includes a light-emitting stage in the operational process. In one embodiment, the non-bias stage is the light-emitting stage of the pixel circuit.

Figure 5:
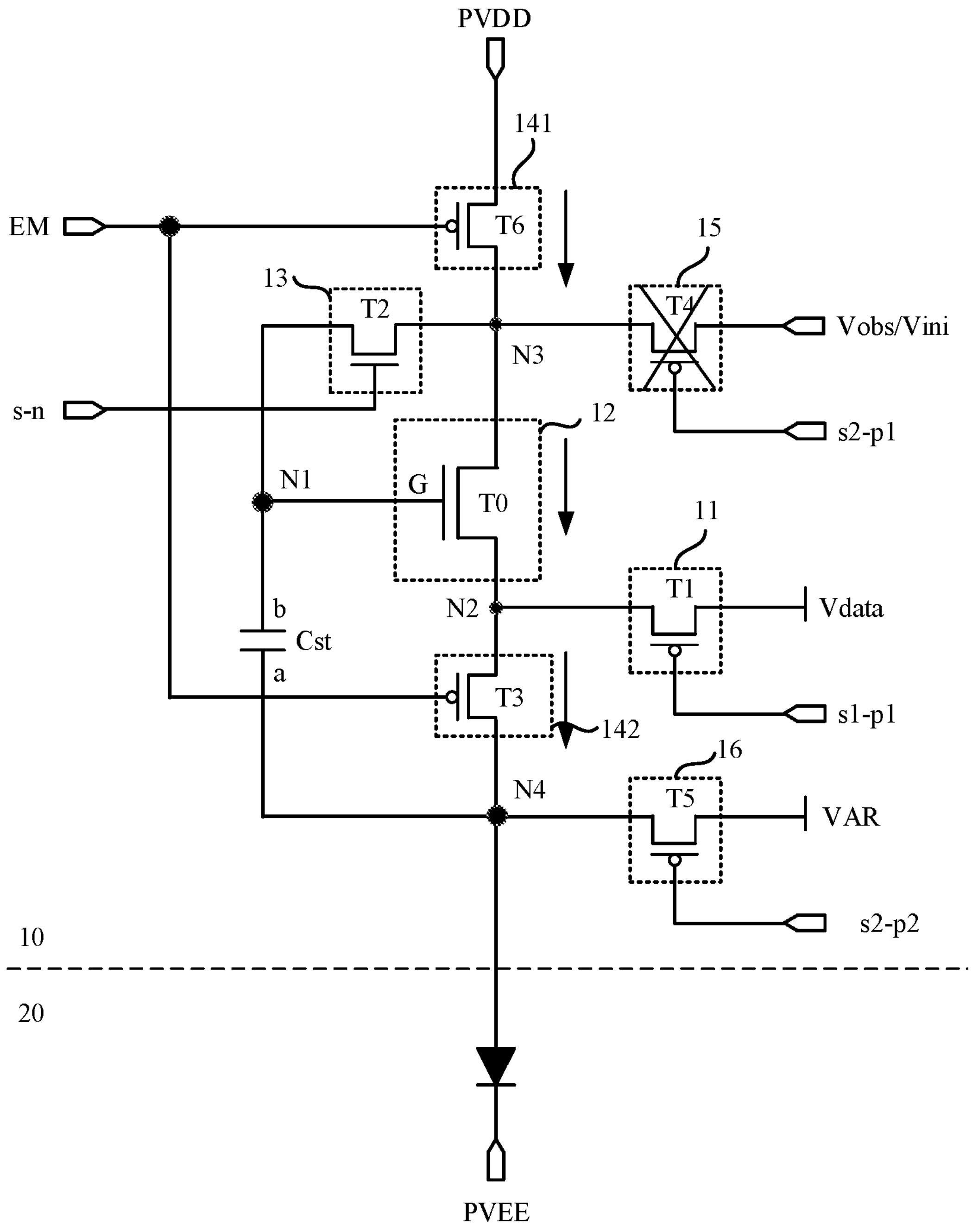
FIG. 5 illustrates an exemplary schematic diagram of a light-emitting stage of the pixel circuit shown in FIG. 2, consistent with the disclosed embodiments of the present disclosure.

FIG. 5 illustrates a light-emitting stage of the pixel circuit shown in FIG. 2. The arrow direction indicates the direction of the signal path. In the light-emitting stage, a light-emission control signal EM outputs an effective pulse signal to turn on the sixth transistor T6 and the third transistor T3. Accordingly, the driving transistor T0 is connected to the light-emitting element 20, and the driving current flows into the light-emitting element 20 to make the light-emitting element 20 to emit light. In the non-light-emitting stage, the light-emission control signal EM outputs an invalid pulse to turn off the sixth transistor T6 and the third transistor T3, and thus the light-emitting element 20 does not emit light. The non-light-emitting stage of the pixel circuit 10 may include a bias stage. In the bias stage, the compensation module 13, the sixth transistor T6 and the third transistor T3 are kept off. Accordingly, the second terminal of the driving transistor may receive a bias signal lower than the voltage of the first power signal, and the potential difference between the gate and the second terminal of the driving transistor T0 may thus be improved.

Specific structures and solutions of the pixel circuit as shown in FIG. 2 are described below.

With reference to FIG. 2, in one embodiment, the pixel circuit in a display panel may further include a reset module 15. The reset module 15 is connected between a reset signal terminal Vini and the second terminal of the driving transistor T0, and is configured to provide a reset signal to the control terminal of the driving transistor T0. The reset module 15 may be multiplexed as a bias module. In the reset stage, the reset signal terminal Vini receives the reset signal, and in the bias stage, the reset signal terminal Vini receives the bias signal Vobs. In the reset stage, the reset module 15 and the compensation module 13 are turned on, and the reset signal is applied to the control terminal of the driving transistor T0. In the bias stage, the reset module 15 is turned on, the compensation module 13 is turned off, and the bias signal is applied to the second terminal of the driving transistor T0.

In one embodiment, the reset module 15 includes a fourth transistor T4. The first terminal of the fourth transistor T4 receives the reset signal Vini. The second terminal of the fourth transistor T4 is electrically connected to the second terminal of the driving transistor T0. A gate of the fourth transistor T4 receives a third scan signal s2-p1. The third scan signal s2-p1 and the first scan signal s-n are pulse signals. Effective pulses of the third scan signal s2-p1 and the first scan signal s-n may control the fourth transistor T4 and the second transistor T2 to turn on, respectively. Accordingly, the reset signal Vini may be applied to the control terminal of the driving transistor T0 to reset the control terminal of the driving transistor. When the third scan signal s2-p1 is an effective pulse and the first scan signal s-n is an ineffective pulse, the fourth transistor T4 is turned on and the second transistor T2 is turned off. Accordingly, the reset signal terminal provides a bias signal Vobs for adjusting the potential of the second terminal of the driving transistor T0 and improving the potential difference between the gate and the second terminal of the driving transistor. In one embodiment, the fourth transistor T4 may be a silicon-based semiconductor transistor or an oxide semiconductor transistor. For example, the fourth transistor T4 may be a low temperature polysilicon (LTPS) transistor or a indium gallium zinc oxide (IGZO) transistor, and is not limited in the present disclosure.

It should be noted that, in the pixel circuit shown in FIG. 2, the NMOS driving transistor may be set to be a double-gate transistor. The double-gate transistor includes a first gate and a second gate. The first gate is the control terminal of the driving transistor, that is, configured to receive a data signal. The second gate is configured to connect a threshold voltage feedback unit. Specifically, the first gate may be a bottom gate of the double-gate transistor, and the second gate may be a top gate of the double-gate transistor. By using a plurality of gate structures, the off current of the driving transistor may be reduced, and the withstand voltage of the transistor may be increased to improve reliability. Even if the drain-source voltage fluctuates when the transistor is operating in a saturation region, the drain-source current may not fluctuate greatly, such that the driving transistor may obtain flat characteristics. In addition, since the second gate is connected to the threshold voltage feedback unit, threshold voltage feedback information may be provided by using the threshold voltage feedback unit. Accordingly, the operational state of the driving transistor may be adjusted, and the threshold voltage drift caused by the aging of the driving transistor may be compensated. At a same time, the threshold voltage feedback unit may also compensate for the difference in the mobility of the driving transistor. Accordingly, the problem of uneven luminance of light-emitting elements caused by the threshold voltage drift and mobility difference of the driving transistor may be solved, and further the uniformity of the display panel may be improved.

Figure 6:
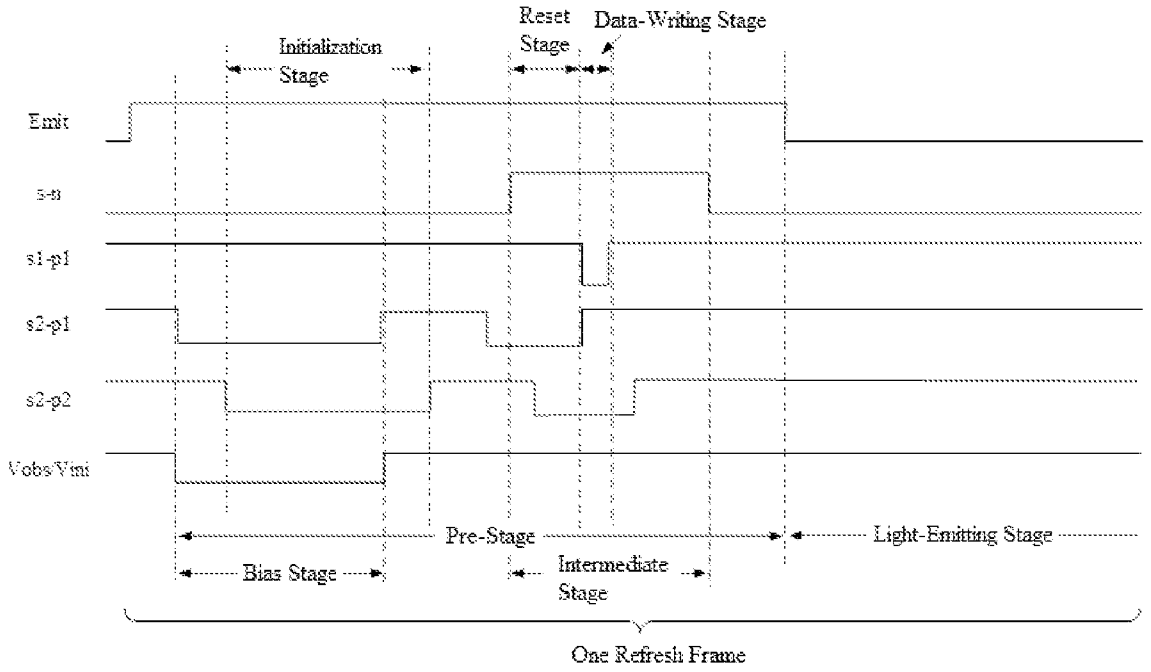
FIG. 6 illustrates an operational sequence of the pixel circuit shown in FIG. 2, consistent with the disclosed embodiments of the present disclosure.

In a display panel provided by the present disclosure, during a multi-frame time, each pixel circuit corresponding to the light-emitting element in the display panel needs to perform refreshing work. That is, the light-emitting elements are driven to emit light through the pixel circuits. FIG. 6 illustrates an operational sequence of the pixel circuit shown in FIG. 2. In one embodiment, with reference to FIG. 6, within one frame of the display panel, an operational process of the pixel circuit may be set to include a pre-stage and a light-emitting stage. In at least one frame, the pre-stage of the pixel circuit includes a bias stage.

In one embodiment, within one frame of the display panel, the operational process of the pixel circuit includes a pre-stage and a light-emitting stage. In a multi-frame image, in at least one frame, the pre-stage of the pixel circuit includes a bias stage. In the bias stage, a bias signal is written into the second terminal of the driving transistor, thereby adjusting the potential difference between the gate and the second terminal, such that the driving transistor may be biased. In the non-biased stage such as the light-emitting stage, the gate of the driving transistor may have a potential greater than the potential of the second terminal, causing the threshold voltage of the driving transistor to drift. Adding a bias stage to the pixel circuit in at least one frame may improve the display uniformity of the display panel, since the bias stage may at least partially balance the increase of the threshold voltage of the driving transistor in the non-bias stage.

It should be noted that, FIG. 6 shows the operational sequence of the pixel circuit within one frame. The pre-stage and the light-emitting stage are used only to illustrate the sequence relationship, while the duration and proportional relationships between the pre-stage and the light-emitting stage are not limited here.

With continuous reference to FIGS. 2 and 6, in at least a portion of the bias stage, an initialization stage may be set. In the initialization stage, the initialization module 16 is turned on, and the initialization signal Vini may be applied to the light-emitting element 20. Further, the pixel circuit may include a storage capacitor Cst. The storage capacitor Cst is connected between the control terminal of the driving transistor T0 and the light-emitting element 20. During at least a portion of the bias stage, the initialization module 16 is turned on. Under the initialization signal Vini and the storage capacitor Cst, the potential of the control terminal of the driving transistor T0 may be maintained. Specifically, in the initialization stage, the light-emission control signal EM is an invalid pulse signal, and the sixth transistor T6 and the third transistor T3 are turned off. At the same time, the fourth scan signal s2-p2 is an effective pulse signal, the fifth transistor T5 is turned on, and the initialization signal VAR is written into the fourth node N4. That is, the fourth node N4 maintains the initialization potential, such that the light-emitting element 20 is initialized.

In one embodiment, as shown in FIG. 6, the initialization stage and the bias stage partially overlap, such that the operational time of one frame of the pixel circuit may be shortened. In some other embodiments, the initialization stage may not overlap with the bias stage, or during the entire bias stage, the initialization stage may be performed at a same time. The initialization stage may also start before the bias stage, and after the initialization stage ends, the bias stage still operates.

Figure 7:
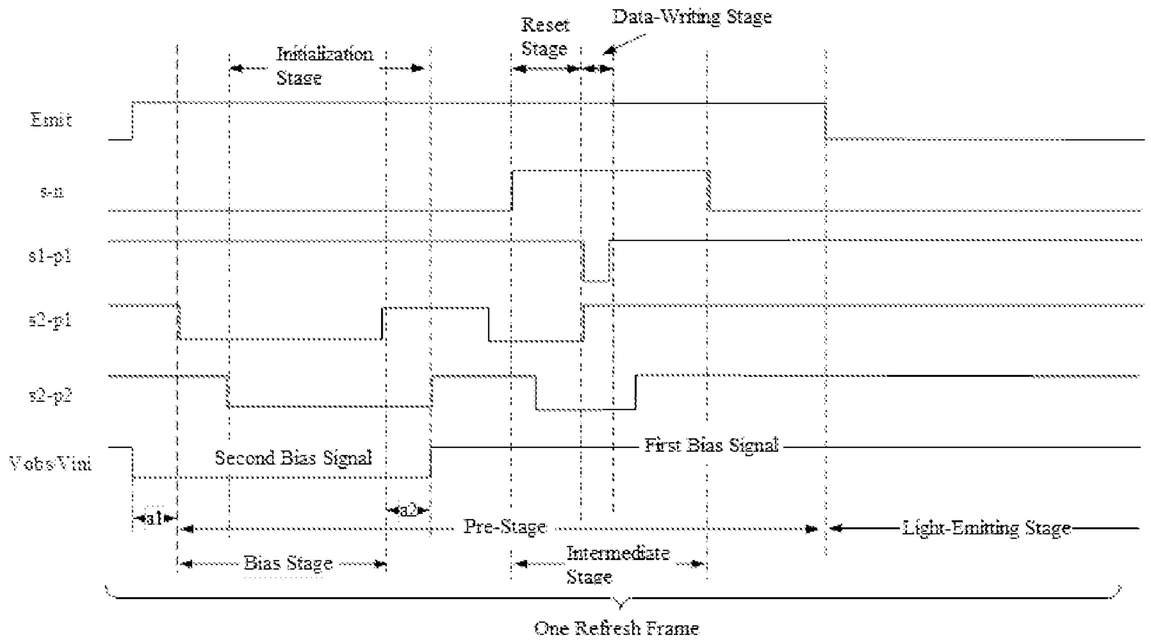
FIG. 7 illustrates another operational sequence of the pixel circuit shown in FIG. 2, consistent with the disclosed embodiments of the present disclosure.

FIG. 7 illustrates another operational sequence of the pixel circuit shown in FIG. 2. With reference to FIG. 7, in one embodiment, the bias signal may include a first bias signal and a second bias signal, and a potential of the second bias signal is lower than a potential of the first bias signal. In the non-bias stage, the bias signal is the first bias signal. Before the bias stage starts, the bias signal is transformed into the second bias signal. The bias stage may start after a first interval stage a1.

With reference to FIG. 2, in the bias stage, the second bias signal with a lower potential is written into the second terminal of the driving transistor T0, that is, the third node N3, such that the potential of the second terminal may be lowered. Accordingly, the potential difference between the gate and the second terminal of the driving transistor T0 may be improved. As such, the driving transistor T0 may be reversely biased, and the drift of the threshold voltage of the driving transistor T0 in the non-biased stage may be balanced. In the unbiased stage, the second terminal of the driving transistor may maintain a higher potential. Especially during the light-emitting stage, since the sixth transistor T6 is turned on, the voltage of the first power signal is input to the second terminal of the driving transistor. At this time, the gate potential of the driving transistor may be lower than the potential of the second terminal. At the same time, the gate potential of the driving transistor may be higher than the potential of the first terminal potential, that is, the gate potential of the driving transistor T0 may be greater than the source potential of the driving transistor T0. Accordingly, the driving transistor may be turned on and the light-emitting element 20 may be driven to emit light.

It may be understood that the bias signal Vobs is essentially a pulse signal. When the pulse signal is switched between a high potential and a low potential, there may be a delay in the rising or falling edge of the pulse signal. In the first interval stage a1 before the bias stage, the second bias signal with a lower-potential is written into the second terminal, providing a time margin for switching the first bias signal to the second bias signal, also providing a buffer time for the potential drop of the second terminal. Accordingly, it may be avoided that at the beginning of the bias stage, due to the difference in the turn-on time between the third scan signal s2-p1 and the bias signal, the first bias signal at a higher potential is input to the second terminal of the driving transistor in the bias stage. As such, the second terminal may receive a stable low-potential signal during the bias stage, and a good bias effect may thus be achieved during the bias stage. Accordingly, stability of the pixel circuit may be improved.

In one embodiment, at the end of the bias stage, the bias signal may remain as the second bias signal. After a second interval stage a2, the bias signal changes to the first bias signal. By setting the second interval stage a2 immediately after the bias stage, during the second interval stage a2, the second terminal of the driving transistor T0 may still be provided with the second bias signal with a lower potential. It may be avoided that at the end of the bias stage, due to the off time difference between the third scan signal s2-p1 and the bias signal, the first bias signal with a higher potential may be input to the second terminal of the driving transistor during the bias stage, thereby affecting the effect of the reverse bias of the driving transistor. For the second terminal in the bias stage, the second interval stage a2 may stabilize the potential of the second bias signal during the bias stage. Accordingly, adjustment of the potential difference between the gate and the second terminal of the driving transistor in the bias stage may be achieved.

Specifically, considering conversion processes of the first bias signal and the second bias signal, delay of the rising edge or the falling edge of the pulse signal may be different. Those skilled in the art may set durations of the first interval stage and the second interval stage according to characteristics of actual pulse signals. In addition, the duration of the first interval stage a1 may be set to be shorter than the duration of the bias stage, or the duration of the second interval stage a2 may be shorter than the duration of the bias stage. The first interval stage a1 and the second interval stage a2 are mainly configured to stabilize the pulse signal of the bias signal. The bias stage is mainly responsible for adjusting the potential of the second terminal of the driving transistor T0 by using the second bias signal to improve the potential difference between the gate and the second terminal. The duration of the bias stage may be chosen to be longer than the duration of the first interval stage a1 or the second interval stage a2. Accordingly, adjustment of the potential of the second terminal of the driving transistor T0 by the second bias signal may be achieved, and the potential difference between the gate and the second terminal may be improved. As such, the drift of the threshold voltage of the driving transistor in the unbiased stage may be balanced.

When a display panel displays an image, a certain period of display time needs to be set, such that a viewer may realize visual residue, and a continuous animation effect may be formed when a plurality of images is refreshed. Thus, for each image displayed on the display panel, an image refresh cycle may need to be set. In one image refresh cycle, a plurality of refresh frames may be set. In a high-frequency driving mode, each of the plurality of refresh frames in the image refresh cycle may be a data-writing frame. In the data-writing frames, the data signals corresponding to images to be displayed are written to the pixel circuit to drive the display. In a low-frequency driving mode, the plurality of refresh frames may include at least one data-writing frame and a plurality of holding frames. The data-writing frame is configured to write the data signals corresponding to the image to be displayed to the pixel circuit to drive the display. No data signals are written in the holding frame, the data signal saved in the data-writing frame may be used to display, and thus the image display in the data-writing frame may be remained. Accordingly, the low-frequency driving mode may reduce the number of times of data-writing, thereby reducing the power consumption of the display panel.

In the present disclosure, the display panel is applicable to high-frequency driving mode and low-frequency driving mode for image refreshing. To reduce the power consumption of the display panel, a low-frequency drive mode may be used to refresh images. Specifically, one data-writing cycle of the display panel may include S image refresh frames, with S>0. The S image refresh frames of may include data-writing frames and holding frames. On this basis, the pixel circuit may be set to include a bias stage and an intermediate stage in pre-stages of the data-writing frame and the holding frame. In the bias stage, the compensation module may be turned off, and in the intermediate stage, the compensation module may be turned on. The bias stage may be performed before the intermediate stage, or, the bias stage may be performed after the intermediate stage.

In the operational sequences of the pixel circuit shown in FIG. 6 and FIG. 7, the intermediate stage corresponds to the effective pulse signal stage of the first scan signal s-n. The compensation module 13 is turned on in the intermediate stage. As shown in FIG. 6 and FIG. 7, the bias stage is set before the intermediate stage. That is, in the refresh cycle of one frame of the pixel circuit, the potential of the second terminal of the driving transistor may be adjusted in an early stage to balance the potential difference between the gate and the second terminal of the driving transistor. Those skilled in the art may understand that in the bias stage, except that the bias module is turned on, other related modules are generally turned off. The bias adjustment may not affect potentials of other modules and nodes. Thus, the intermediate stage may also be set after the bias stage.

With continuous reference to FIG. 7, in one embodiment, at least one data-writing frame includes a bias stage. The intermediate stage includes a reset stage and a data-writing stage. In the reset stage, the compensation module and the reset module are turned on, and the reset module provides a reset signal for the control terminal of the driving transistor. In the data-writing stage, the reset module is turned off, and the data-writing module, the driving module, and the compensation module are turned on. Thus, the data signal may be written into the control terminal of the driving transistor.

The operational sequence of the pixel circuit shown in FIG. 7 is essentially the operational sequence of the pixel circuit in the data-writing frame. The data-writing frame also includes a bias stage.

With reference to FIG. 2 and FIG. 7, the operational processes of the reset stage and the data-writing stage of the pixel circuit are described below. In the reset stage, the gate of the fourth transistor T4 receives the effective pulse signal of the third scan signal s2-p1, and the reset module 15 is turned on. Meanwhile, the gate of the second transistor T2 receives the effective pulse signal of the first scan signal s-n, and the compensation module 13 is turned on. At this time, the reset signal Vini at the reset signal terminal is written into the control terminal of the driving transistor T0, that is, the first node N1, through the reset module 15 and the compensation module 13. The reset signal Vini is a high-potential signal. In the data-writing stage, the gate of the first transistor T1 receives the effective pulse signal of the second scan signal s1-p1, and the data-writing module 11 is turned on. Accordingly, the data signal terminal may provide the data signal Vdata to the first terminal of the driving transistor T0, that is, the second node N2. Meanwhile, the gate of the second transistor T2 receives the effective pulse signal of the first scan signal s-n, and the compensation module 13 is turned on. It may be understood that, in the reset stage before the data-writing stage, since the first node N1 is at a high potential, and due to the existence of the storage capacitor Cst, the potential V1 of the first node N1 may remain at a high potential. By setting the voltage value of the reset signal Vini, (V1>Vdata) may be achieved at this time. Thus, the NMOS driving transistor T0 may be turned on, and the data voltage Vdata may be written to the control terminal of the driving transistor. It may be understood that this step is essentially a process of charging the storage capacitor Cst. Moreover, since the driving transistor itself may have a threshold voltage Vth, the voltage of Vdata+Vth may be written into the first node N1 through the compensation module 13 to achieve the compensation of the data voltage.

By setting at least one data-writing frame to include a bias stage, the pixel circuit may use the bias stage to bias the driving transistor in the data-writing frame. Thus, the threshold voltage drift of the driving transistor in the unbiased stage may be reduced. It may be understood that when an image of the display panel is refreshed, if more data-writing frames including the bias stage are set, the threshold voltage of the driving transistor in the pixel circuit may be more stable.

In addition, to improve the bias effect of the bias stage, the duration of the bias stage should be increased as much as possible. In addition to setting the bias stage in a plurality of data-writing frames, the durations of the bias stages in the data-writing frames may also be set. Specifically, the durations of the bias stages may be set to be longer than the duration of the intermediate stage.

Figure 8:
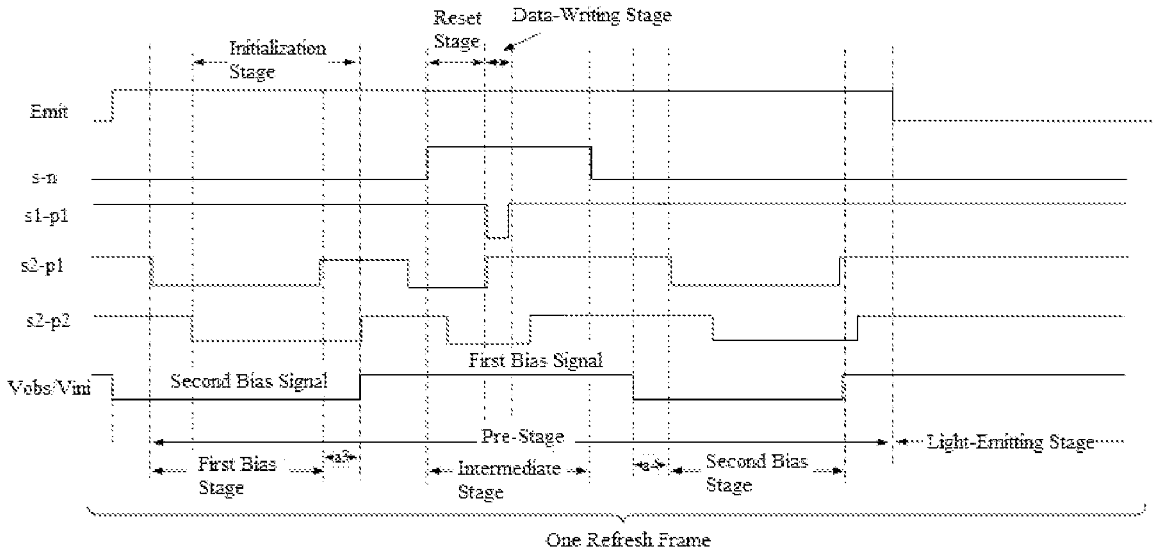
FIG. 8 illustrates an operational sequence of a holding frame of the pixel circuit shown in FIG. 2, consistent with the disclosed embodiments of the present disclosure.

FIG. 8 illustrates an operational sequence of a holding frame of the pixel circuit shown in FIG. 2. Referring to FIG. 8, in one embodiment, the pre-stage may sequentially include a first bias stage, an intermediate stage, and a second bias stage. A third interval stage a3 may be included between the first bias stage and the intermediate stage, and a fourth interval stage a4 may be included between the intermediate stage and the second bias stage.

In one frame of image time, the pre-set stage may include a first bias stage and a second bias stage, and the bias duration of the driving transistor may thus be increased. Accordingly, the potential difference between the gate and the second terminal of the driving transistor T0 may be effectively balanced. Meanwhile, an interval stage may be set between the intermediate stage and the bias stage, and a time margin may thus be provided. Accordingly, the pulse signal, as the bias signal, may complete the conversion between the high potential and the low potential, and thus the impact of delay in the conversion between the high potential and the low potential may be avoided. Accordingly, the bias signal written in the first bias stage and the second bias stage may be stable. That is, the balance effect of the bias stage on the threshold voltage of the driving transistor may be improved.

It should be noted that, in an entire frame of time, during the first bias stage, the second bias stage, the third interval stage, and the fourth interval stage, other associated modules of the pixel circuit are in the off state. Accordingly, the first bias stage, the second bias stage, the third interval stage, and the fourth interval stage may not affect other associated modules. On this basis, to improve the operational efficiency and operational quality of each stage, especially the bias stage, within one image frame of the pixel circuit, durations of the bias stage and the interval stage may be designed. In some embodiments, the duration of the first bias stage may be set to be longer than the duration of the second bias stage; or, the duration of the first bias stage may be shorter than the duration of the second bias stage. In addition, as mentioned above, the bias stage is mainly responsible for using the bias signal to adjust the potential of the second terminal of the driving transistor, thereby improving the potential difference between the gate and the second terminal. The interval stage is mainly used to provide time margin to stabilize the pulse signal of the bias signal. The duration of the interval stage may only include one reaction duration, and the interval stage does not require a longer duration. As such, in some other embodiments of the present disclosure, the duration of the third interval stage may be shorter than the duration of the first bias stage; or, the duration of the fourth interval stage may be shorter than the duration of the second bias stage.

Figure 9:
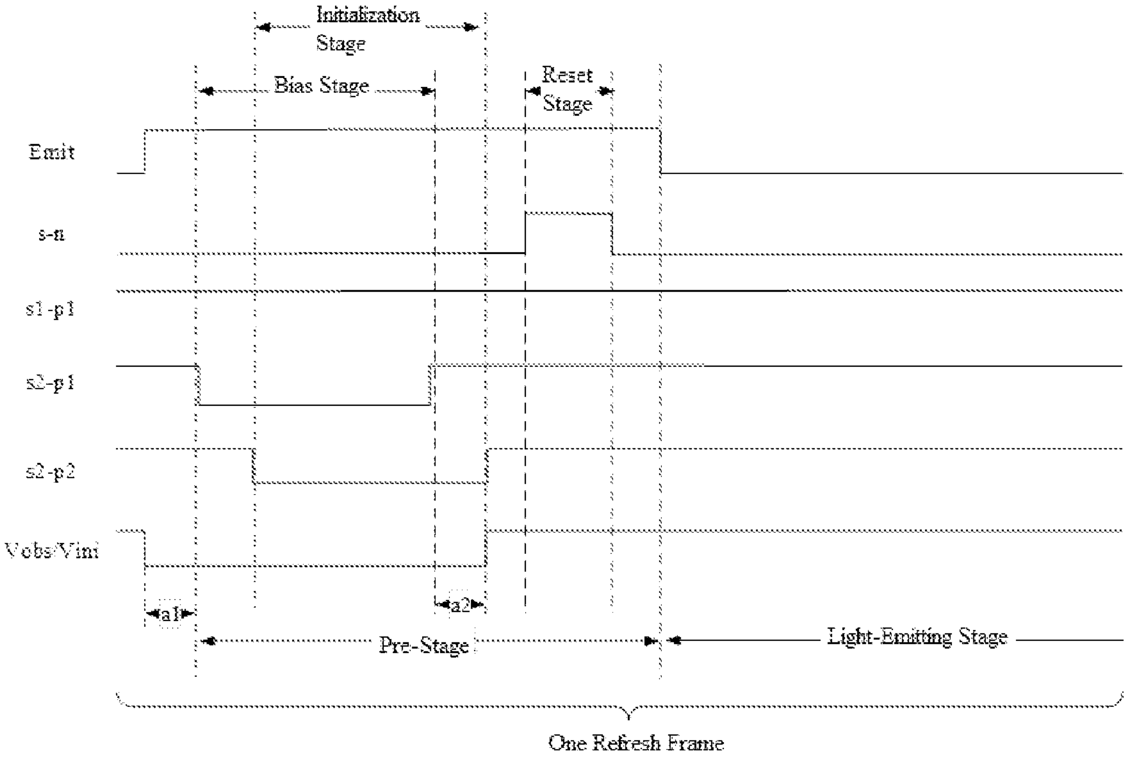
FIG. 9 illustrates another operational sequence of a holding frame of the pixel circuit shown in FIG. 2, consistent with the disclosed embodiments of the present disclosure.

FIG. 9 illustrates another operational sequence of a holding frame of the pixel circuit shown in FIG. 2. Referring to FIG. 9, in one embodiment of the present disclosure, at least one holding frame is set to include a bias stage. The pre-stage does not include a reset stage and a data-writing stage.

It may be understood that, in an image refresh process of a display panel driven at a low frequency, at least one holding frame may be set to include a bias stage. The bias stage may be configured to balance the threshold voltage of the driving transistor of the pixel circuit. Moreover, for the low-frequency driving mode, during the image refresh of the display panel, the number of holding frames may be greater than the number of data-writing frames. Since the bias stage is set in the holding frame, the second terminal of the driving transistor may receive the bias signal for a plurality of times during the entire image frame. Accordingly, the potential difference between the gate and the second terminal of the driving transistor may be balanced for a longer time. Thus, bias adjustment of the driving transistor may be improved, such that the offset of the threshold voltage of the driving transistor in the non-bias stage may be reduced, and the stability of the electrical performance of the driving transistor may be improved.

With continuous reference to FIG. 9, in one embodiment of the present disclosure, at least one holding frame is set to include a bias stage. The intermediate stage includes a reset stage. In the reset stage, the compensation module and the reset module are turned on, and the reset module provides a reset signal for the control terminal of the driving transistor.

Figure 10:
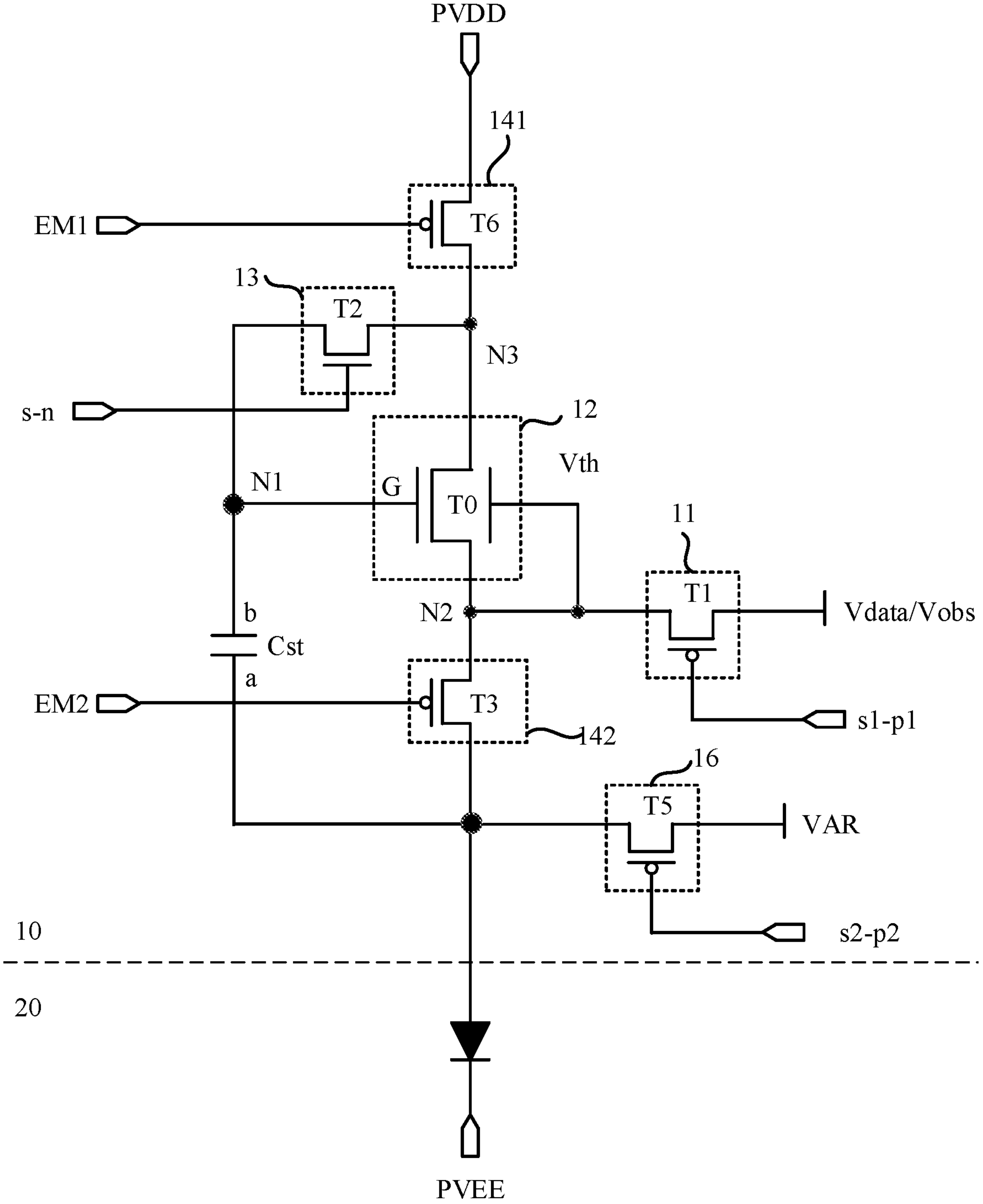
FIG. 10 illustrates a schematic structural diagram of a pixel circuit of another display panel consistent with the disclosed embodiments of the present disclosure.

For the bias adjustment of the driving transistor in the pixel circuit, the present disclosure also provides another display panel pixel circuit. FIG. 10 illustrates a schematic structural diagram of another pixel circuit of a display panel consistent with the disclosed embodiments of the present disclosure. As shown in FIG. 10, the display panel includes a pixel circuit 10 and a light-emitting element 20. The pixel circuit 10 includes a data-writing module 11, a driving module 12, a compensation module 13, and a first light-emission controller 141. The driving module 12 is configured to provide a driving current for the light-emitting element 20. The driving module 12 includes a driving transistor T0, and the driving transistor T0 is an NMOS transistor. The data-writing module 11 is connected between a data signal input terminal Vdata and a first terminal of the driving transistor T0, that is, a second node N2, for selectively providing a data signal to the driving module 12. The compensation module 13 is configured to compensate the threshold voltage of the driving transistor T0. The first light-emission controller 141 is connected between a first power signal terminal PVDD and a second terminal of the driving transistor T0, that is, a third node N3, for selectively providing a first power signal PVDD for the driving module 12. An operational process of the pixel circuit 10 includes a bias stage. In the bias stage, the compensation module 13 is turned off, and the driving transistor T0 receives the bias signal Vobs. The bias signal Vobs may be used to adjust the bias state of the driving transistor T0.

The pixel circuit also includes a second light-emission controller 142 and an initialization module 16. The second light-emission controller 142 is connected between the light-emitting element 20 and the first terminal of the driving transistor T0, and is configured to selectively allow a driving current to flow into the light-emitting element 20. The initialization module 16 is connected between the initialization signal terminal VAR and the light-emitting element 20, and is configured to selectively provide an initialization signal for the light-emitting element 20.

In one embodiment, a light-emission controller in the pixel circuit 10 includes a first light-emission controller 141 and a second light-emission controller 142. An input terminal of the first light-emission controller 141 receives a first power signal PVDD. A control terminal of the first light-emission controller 141 receives a first light-emission control signal EM1, and a first terminal of the first light-emission controller 141 is electrically connected to the second terminal of the driving module 12. An input terminal of the second light-emission controller 142 is electrically connected to a first terminal of the driving transistor T0. A control terminal of the second light-emission controller 141 receives a second light-emission control signal EM2. An output terminal of the second light-emission controller 142 is electrically connected to the light-emitting element 20.

The first light-emission control signal EM1 and the second light-emission control signal EM2 are pulse signals, and their effective pulses may respectively control the first light-emission controller 141 and the second light-emission controller 142 to be turned on. Accordingly, the first power signal PVDD may be provided to the driving module 12 and drive the light-emitting element 20 to emit light. Invalid pulses of the first light-emission control signal EM1 and the second light-emission control signal EM2 may control the first light-emission controller 141 and the second light-emission controller 142 to be turned off. Accordingly, under the control of the light-emission control signal EM, the first light-emission controller 141 and the second-mission controller 142 may selectively provide the driving module 12 with the first power signal PVDD.

In one embodiment, the light-emission controller includes a first light-emission controller 141 and a second light-emission controller 142. The first light-emission controller 141 and the second light-emission controller 142 respectively receive the first light-emission control signal EM1 and the second light-emission control signal EM2, such that the two light-emission controllers may be controlled separately and independently. During a light-emitting stage, effective pulse signals may be provided at a same time to control the light-emitting element 20 to emit light. In other stages, such as an initialization stage, only the first light-emission controller 141 is turned on, and the gate of the driving transistor T0 may be initialized by the first light-emission controller 141. Details are described later.

In one embodiment, the data-writing module 11 may be multiplexed as a bias module. In a data-writing stage, the data signal input terminal receives the data signal Vdata, and in a bias stage, the data signal input terminal receives the bias signal Vobs. In the data-writing stage, each of the data-writing module 11, the driving module 12, and the compensation module 13 is turned on, and the data signal is written into the control terminal of the driving transistor. In the bias stage, the compensation module 13 is turned off, the data-writing module 11 and the driving module 12 are turned on, and the bias signal is written into the second terminal of the driving transistor T0.

In one embodiment, as shown in FIG. 10, the driving transistor T0 may be a double-gate transistor, and the double-gate transistor may include a first gate and a second gate. The first gate is the control terminal of the driving transistor, that is, the first gate is electrically connected to the control terminal of the driving module 12, that is, the first node N1, and is configured to access data signals. The second gate is configured to receive feedback of the threshold voltage. Specifically, the second gate is set to be electrically connected to the output terminal of the data-writing module 11. The second gate and the first terminal of the driving transistor T0 are electrically connected to the output terminal of the data-writing module 11 simultaneously, and may be configured to compensate for the threshold voltage drift caused by aging of the driving transistor, thereby adjusting an operational state of the driving transistor.

For an NMOS-type driving transistor, in a non-bias stage such as a light-emitting stage, the driving transistor is in a state where the gate potential is greater than the source potential. When such a state is kept for a long time, ions inside the driving transistor may be polarized, and then a built-in electric field may be formed inside the driving transistor. Accordingly, the threshold voltage of the driving transistor may increase continuously, and thus the driving current flowing into the light-emitting element may be affected. As a result, display uniformity may be affected.

In one embodiment, a bias stage is added to the operational process of the pixel circuit 10. In the bias stage, the compensation module 13 is turned off, and the first terminal of the driving transistor T0, that is, the second node N2, receives the bias signal Vobs. The bias signal Vobs may be used to adjust the driving transistor T0, such that the potential difference between the gate and the second terminal of the driving transistor T0 may be adjusted. The threshold voltage of the driving transistor T0 may be adjusted by biasing the driving transistor T0. Specifically, by writing the bias signal Vobs into the first terminal of the driving transistor T0, the gate and the first terminal of the driving transistor T0 may satisfy the conduction condition of the driving transistor T0. That is, the first terminal and the second terminal of the driving transistor T0 may be turned on, such that the bias signal Vobs is written into the second terminal. Or, since the driving transistor is essentially a capacitor, the potential of the second terminal may be affected by the potential of the first terminal. When the bias signal Vobs is written into the first terminal of the driving transistor T0, the second terminal potential may be adjusted indirectly. In some cases, the potential of the second terminal of the driving transistor may be adjusted to be lower than the potential of the gate, that is, the potential of the third node N3 may be lower than the potential of the first node N1, and thus the driving transistor may be reversely biased. Accordingly, the internal ion polarity of the driving transistor T0 may be reduced, the threshold voltage of the driving transistor T0 may be lowered, and the driving transistor T0 may be biased. As such, the threshold voltage deviation of the driving transistor T0 in the unbiased stage may be reduced, and the increase in the threshold voltage of the driving transistor in the unbiased stage may be balanced. As a result, the Id-Vg curve may not drift, and thus display uniformity of the display panel may be improved.

Figure 11:
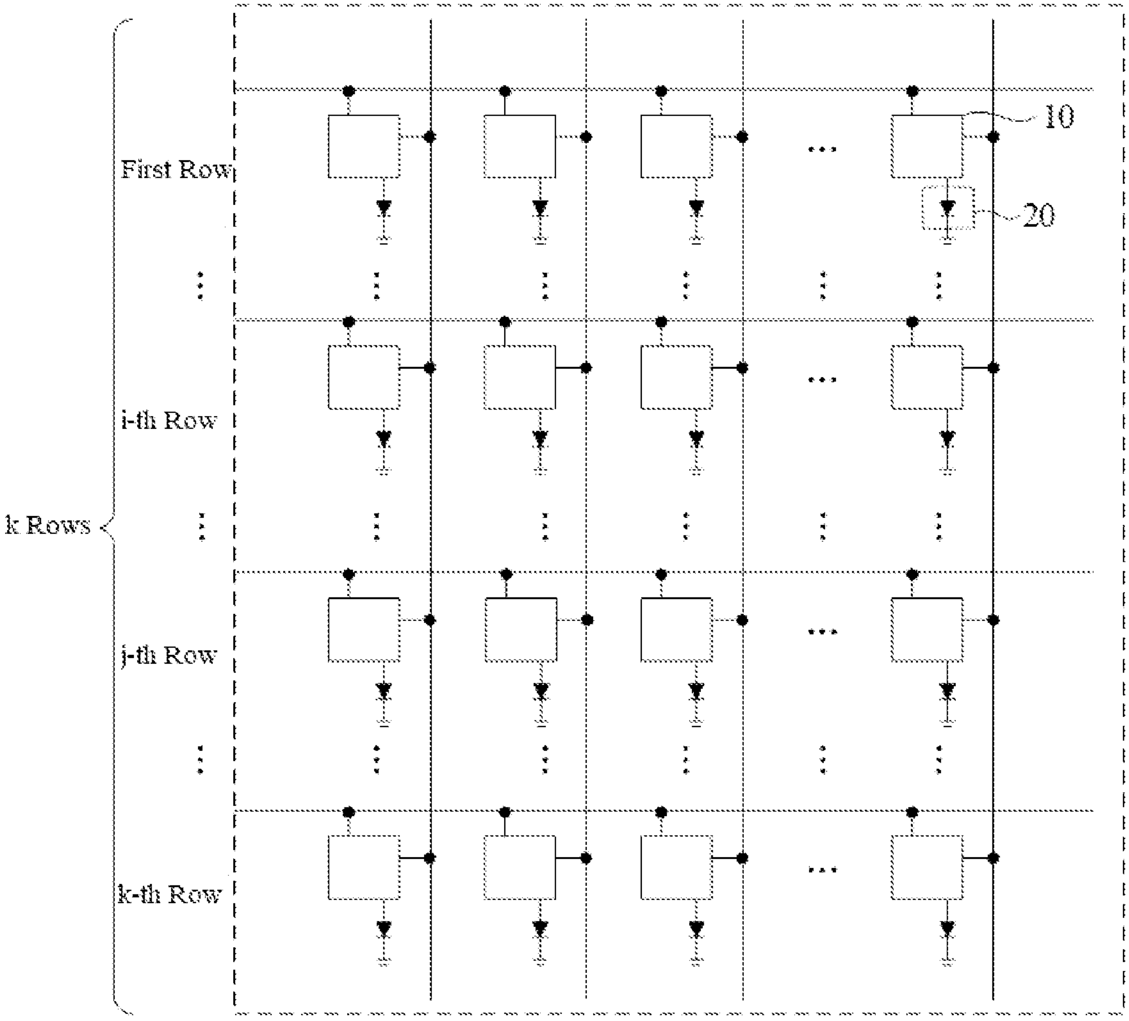
FIG. 11 illustrates is a schematic structural diagram of a display panel consistent with the disclosed embodiments of the present disclosure.

FIG. 11 illustrates is a schematic structural diagram of a display panel consistent with the disclosed embodiments of the present disclosure. In one embodiment, with reference to FIG. 10 and FIG. 11, the pixel circuit shown in FIG. 10 corresponds to a light-emitting element in an i-th row of the display panel. The pixel circuit of the display panel includes k rows of light-emitting elements. During the operation of the pixel circuit corresponding to the light-emitting element in the i-th row, in the bias stage, the data-writing module 11 is turned on. The bias signal written into the second terminal of the driving transistor T0 is a present data signal on the data signal line connected to the data signal input terminal. The present data signal is a data signal of a pixel circuit corresponding to a light-emitting element in the j-th row, written during the data-writing stage, with $k \geq 1$, $1 \leq i \leq k$ and $1 \leq j \leq k$.

The image refresh process of the display panel is essentially that the k rows of light-emitting elements on the display panel are sequentially scanned and refreshed, that is, the light-emitting process is performed on the k-rows of light-emitting elements. In one embodiment, in the process of driving the light-emitting element in the i-th row to emit light, that is, in the operational process of the corresponding pixel circuit, in the pre-stage, a bias stage may be set to be synchronized with the data-writing stage of the pixel circuit corresponding to the j-th row of light-emitting elements. Since the data-writing module 11 may be multiplexed as a bias module, in the bias stage, the bias signal provided by the data signal terminal Vdata is the data signal Vdata' written by the pixel circuit corresponding to the light-emitting element in the jth row during the data-writing stage. It may be understood that, for the light-emitting element in the i-th row, the first node N1 of the pixel circuit has a data signal written in a previous refresh frame, and the potential of the first node N1 is substantially Vdata'+Vth. In the bias stage, the second node N2 is written with the Vdata signal. In some cases, the gate potential of the driving transistor T0 may be greater than the first terminal potential, such that conduction may be achieved. At this time, the second terminal is synchronously written with the bias signal, that is, the third node N3 is written with the Vdata signal, and the gate potential of the driving transistor T0 is greater than the second terminal potential. As such, the driving transistor T0 may be reversely biased, and the deviation of the threshold voltage of the driving transistor T0 in the unbiased stage may be balanced. In another case, the bias signal, that is, the Vdata signal, is written into the second node N2. The potential of the second terminal of the driving transistor T0 may be adjusted by using the characteristic that the driving transistor T0 is essentially a capacitor. Thus, the gate potential of the driving transistor T0 may be greater than the second terminal potential, the driving transistor T0 may be reversely biased. Accordingly, the drift of the threshold voltage in the non-bias stage may be balanced.

Figure 12:
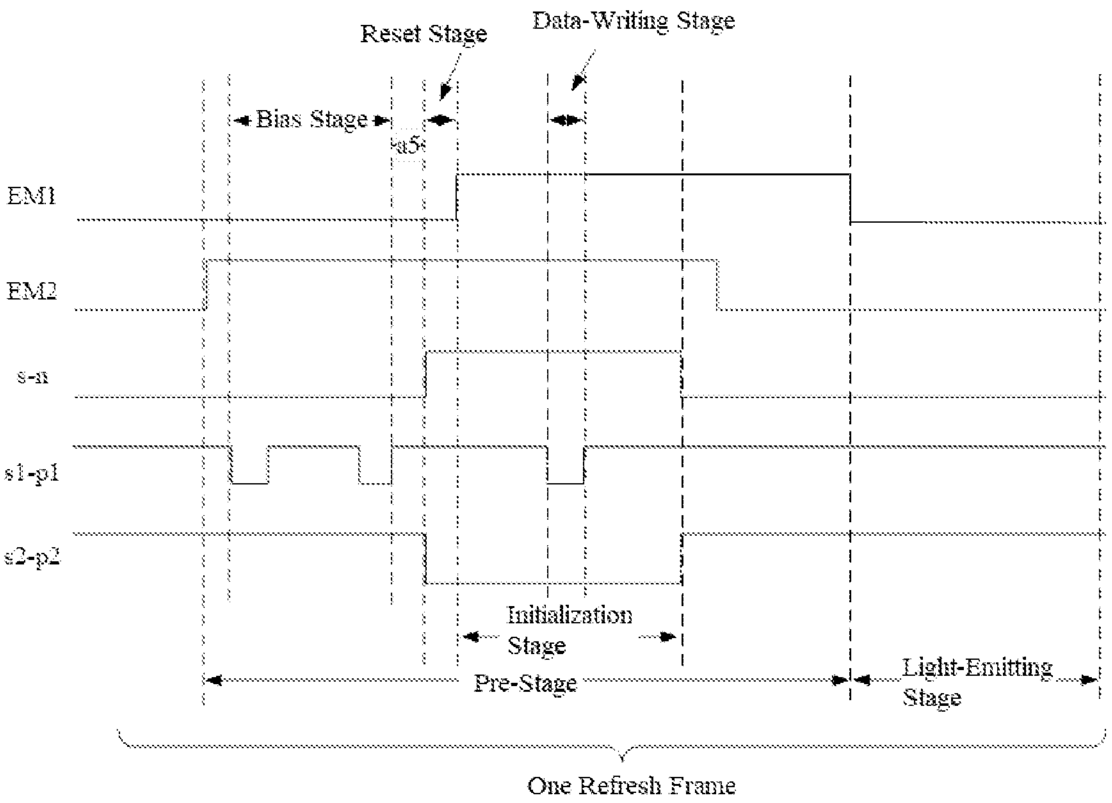
FIG. 12 illustrates an operational sequence diagram of the pixel circuit shown in FIG. 10, consistent with the disclosed embodiments of the present disclosure.
Figure 13:
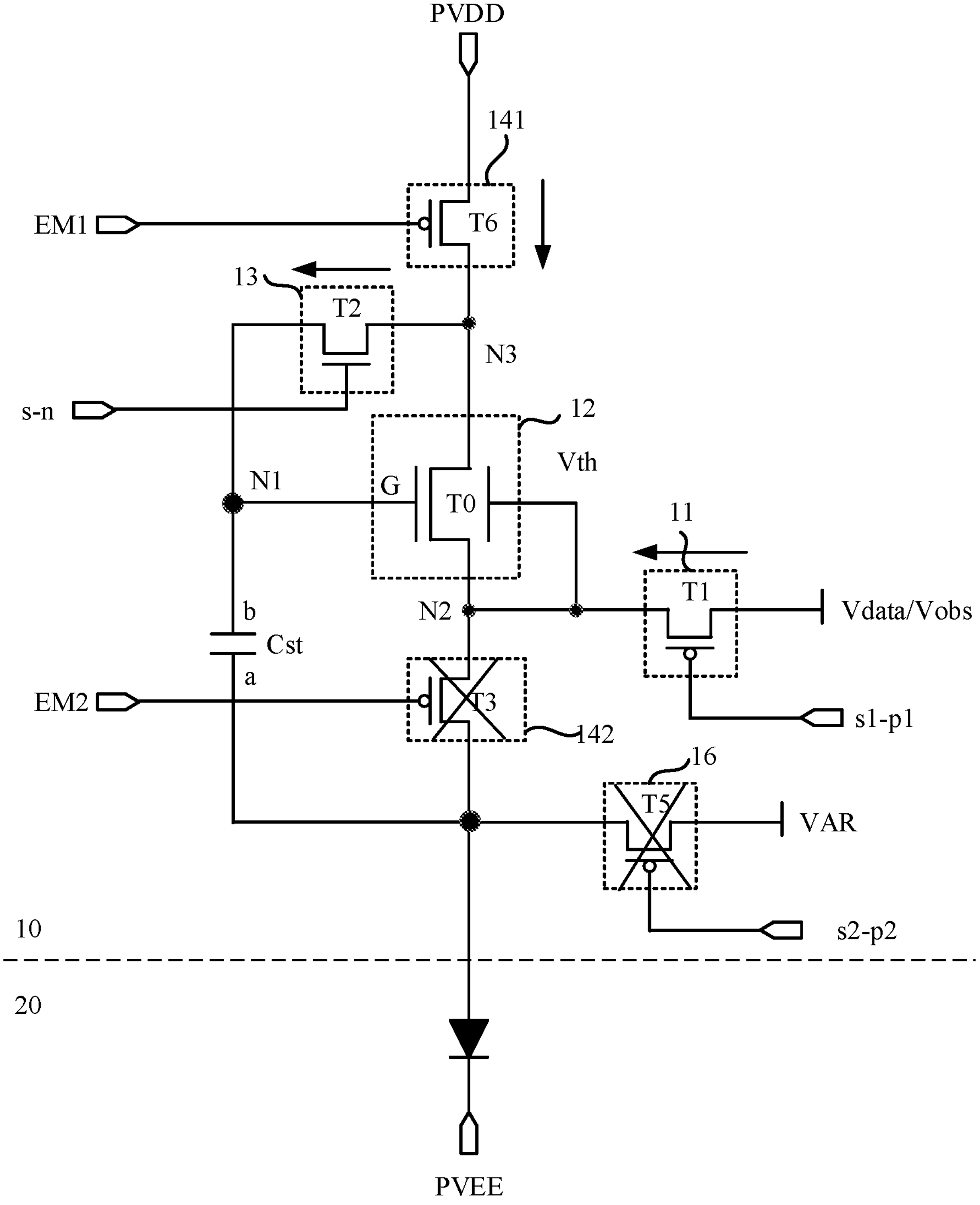
FIG. 13 illustrates an exemplary schematic diagram of a bias stage of the pixel circuit shown in FIG. 10, consistent with the disclosed embodiments of the present disclosure.

FIG. 12 illustrates an operational sequence diagram of the pixel circuit shown in FIG. 10. FIG. 13 illustrates an exemplary schematic diagram of a bias stage of the pixel circuit shown in FIG. 10. With reference to FIGS. 10, 12 and 13, the operational process of the bias stage of the pixel circuit shown in FIG. 10 is described below. In the bias stage, the second light-emission control signal EM2 is an invalid pulse, and the third transistor T3 is turned off. The first light-emission control signal EM1 is an effective pulse, and the sixth transistor T6 is turned on. The first scan signal s-n is an effective pulse, and the second transistor T2 is turned on. At this time, the first power signal is written into the first node N1, that is, the gate of the driving transistor T0, through the sixth transistor T6 and the second transistor T2. The potential of the third node N3 at this time is consistent with the potential of the third node N3 in the unbiased stage. At this time, the gate of the first transistor T1 receives the effective pulse and turns on. The data voltage Vdata written to the pixel circuit corresponding to the j-th row light-emitting element is written into the driving transistor T0 through the first transistor T1, such that the gate potential of the driving transistor T0 may be greater than the second terminal potential. Accordingly, the driving transistor T0 may be reversely biased, and the drift of the threshold voltage of the driving transistor T0 in the unbiased stage may be balanced.

In one embodiment, the positional relationship between the light-emitting elements in the i-th row and the light-emitting elements in the j-th row mainly depends on the refresh direction of the display panel. In a forward data-writing process, the refreshing process of the light-emitting elements in the display panel is from top to bottom. At this time, the light-emitting elements in the i-th row are located under the light-emitting elements in the j-th row, that is, j<i. Specifically, a relationship between i and j may be j=i−1. In a reverse data-writing process, the refreshing process of the light-emitting elements in the display panel is from bottom to top. At this time, the light-emitting element in the i-th row is located above the light-emitting element in the j-th row, that is, j>i. Specifically, a relationship between i and j may be j=i+1.

Figure 14:
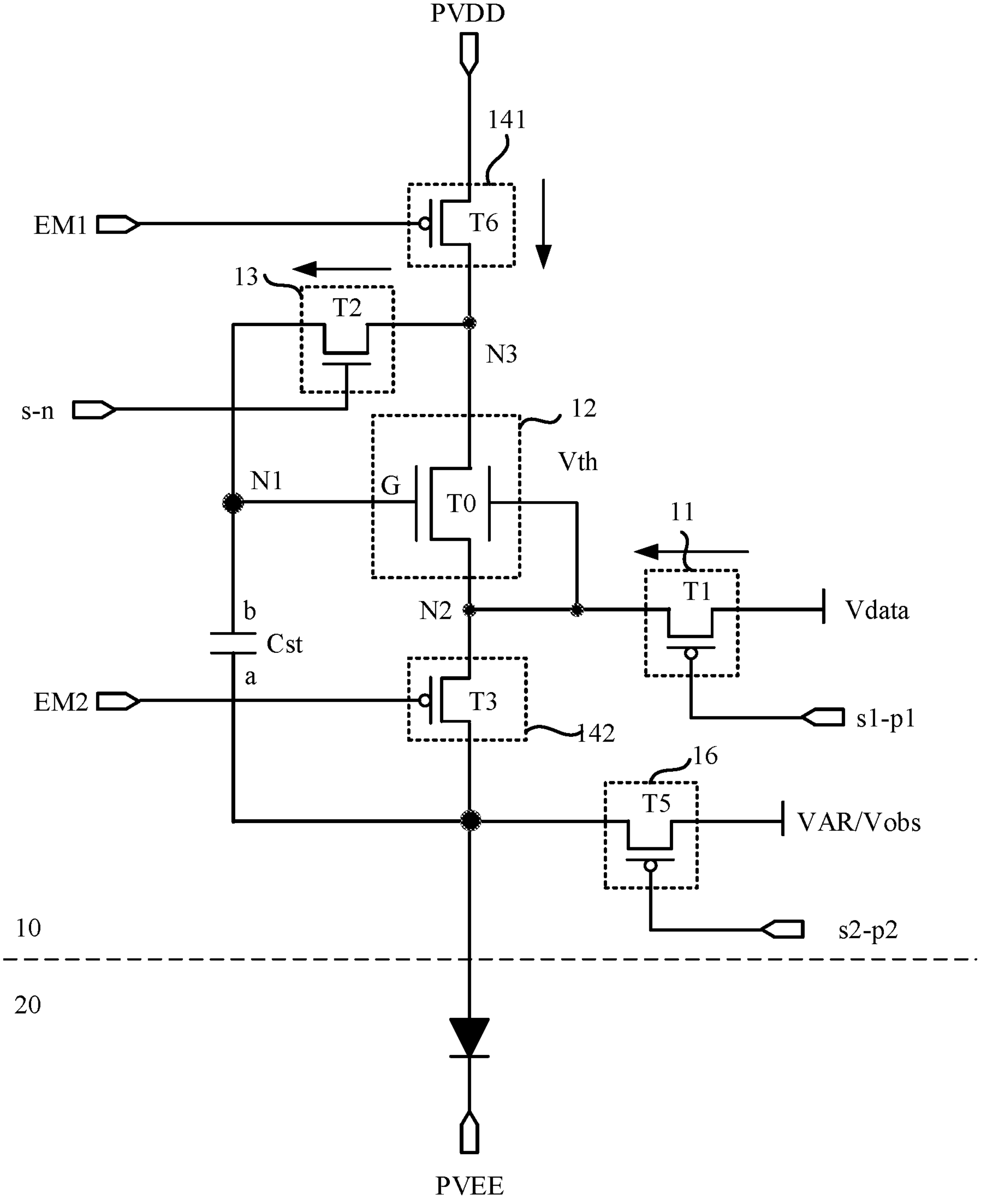
FIG. 14 illustrates a schematic structural diagram of a pixel circuit of another display panel consistent with the disclosed embodiments of the present disclosure.

The present disclosure also provides a pixel circuit of a display panel. FIG. 14 illustrates a schematic structural diagram of a pixel circuit of another display panel. As shown in FIG. 14, the display panel includes a pixel circuit 10 and a light-emitting element 20. The pixel circuit 10 includes a data-writing module 11, a driving module 12, a compensation module 13, and a first light-emission controller 141. The driving module 12 is configured to provide a driving current for the light-emitting element 20. The driving module 12 includes a driving transistor T0, and the driving transistor T0 is an NMOS transistor. The data-writing module 11 is connected between a data signal input terminal Vdata and a first terminal of the driving transistor T0, that is, a second node N2, for selectively providing a data signal to the driving module 12. The compensation module 13 is configured to compensate the threshold voltage of the driving transistor T0. The first light-emission controller 141 is connected between a first power signal terminal PVDD and a second terminal of the driving transistor T0, that is, a third node N3, for selectively providing a first power signal PVDD for the driving module 12. An operational process of the pixel circuit 10 includes a bias stage. In the bias stage, the compensation module 13 is turned off, and the driving transistor T0 receives the bias signal Vobs. The bias signal Vobs may be used to adjust the bias state of the driving transistor T0.

Specifically, the initialization module 16 may be multiplexed as a bias module. In the initialization stage, the initialization signal terminal VAR receives an initialization signal, and in the bias stage, the initialization signal terminal VAR receives a bias signal. In the initialization stage, the first light-emission controller 141 and the second light-emission controller 142 are turned off, and the initialization signal terminal VAR provides the initialization signal for the light-emitting element 20. In the bias stage, the second light-emission controller 142 is turned on, the first light-emission controller 141 is turned off, and the initialization signal terminal VAR provides the bias signal Vobs for the second terminal of the driving transistor T0.

For an NMOS-type driving transistor, in a non-bias stage such as a light-emitting stage, the driving transistor is in a state where the gate potential is greater than the source potential. When such a state is kept for a long time, ions inside the driving transistor may be polarized, and then a built-in electric field may be formed inside the driving transistor. Accordingly, the threshold voltage of the driving transistor may increase continuously, and thus the driving current flowing into the light-emitting element may be affected. As a result, display uniformity may be affected.

In one embodiment, a bias stage is added to the operational process of the pixel circuit 10. In the bias stage, the compensation module 13 is turned off, and the first terminal of the driving transistor T0, that is, the second node N2, receives the bias signal Vobs. The bias signal Vobs may be used to adjust the driving transistor T0, such that the potential difference between the gate and the second terminal of the driving transistor T0 may be adjusted. The threshold voltage of the driving transistor T0 may be adjusted by biasing the driving transistor T0. In some cases, the potential of the second terminal of the driving transistor may be adjusted to be lower than the potential of the gate, that is, the potential of the third node N3 may be lower than the potential of the first node N1, and thus the driving transistor may be reversely biased. Accordingly, the internal ion polarity of the driving transistor T0 may be reduced, the threshold voltage of the driving transistor T0 may be lowered, and the driving transistor T0 may be biased. As such, the threshold voltage deviation of the driving transistor T0 in the unbiased stage may be reduced, and the increase in the threshold voltage of the driving transistor in the unbiased stage may be balanced. As a result, the Id-Vg curve may not drift, and thus display uniformity of the display panel may be improved.

In one embodiment, the control terminal EM1 of the first light-emission controller 141 is connected to the first light-emission control signal line. The control terminal EM2 of the second light-emission controller 142 is connected to the second light-emission control signal line. In other words, the first light-emission controller 141 and the second light-emission controller 142 use two light-emission control signal lines to receive light-emission control signal respectively, and the light-emission control signals provided by the two light-emission control signal lines may be set independently. In the initialization stage, the first light-emission control signal line and the second light-emission control signal line provide invalid pulse signals, and the first light-emission controller 141 and the second light-emission controller 142 are turned off. At this time, the initialization signal terminal VAR may provide an initialization signal for the light-emitting element 20. In addition, in the bias stage, the first light-emission control signal line provides an invalid pulse signal, and the first lighting controller 141 is turned off. The second light-emission control signal line provides an effective pulse signal, and the second lighting controller 142 is turned on. The initialization signal terminal VAR may provide a bias signal Vobs for the first terminal of the driving transistor T0.

Figure 15:
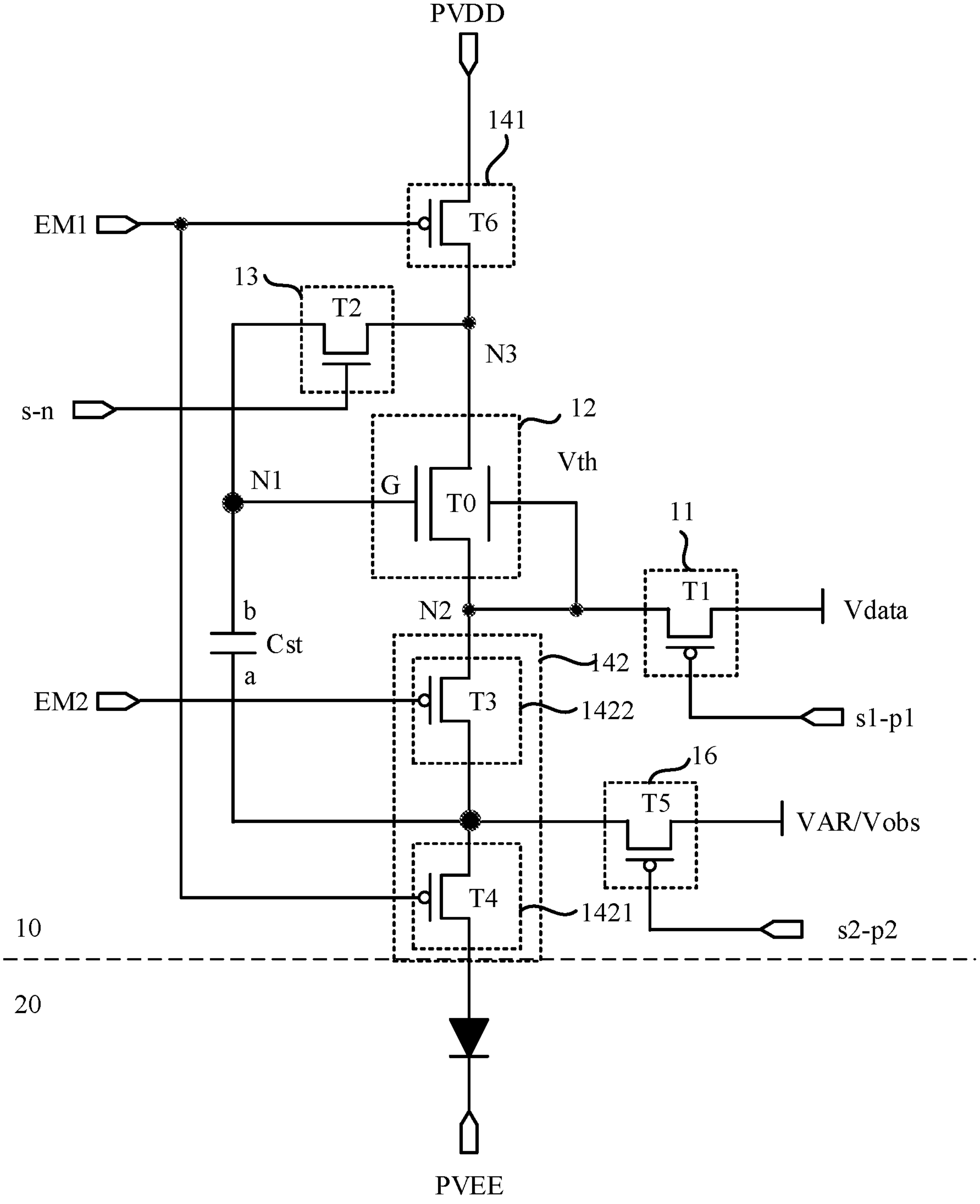
FIG. 15 illustrates a schematic structural diagram of a pixel circuit of another display panel consistent with the disclosed embodiments of the present disclosure.

In one embodiment, the second light-emission controller may include a first sub-light-emission controller and a second sub-light-emission controller. In the bias stage, the first sub-light-emission controller is turned off, and the second sub-light-emission controller is turned on. The initialization module provides a bias signal for the first terminal of the driving transistor through the second sub-light-emission controller. The control terminals of the first light-emission controller and the first sub-light-emission controller are connected to a same light-emission control signal line. FIG. 15 illustrates a schematic structural diagram of a pixel circuit of another display panel consistent with the disclosed embodiments of the present disclosure. In one embodiment, as shown in FIG. 15, the second light-emission controller 142 of the pixel circuit includes a first sub-light-emission controller 1421 and a second sub-light-emission controller 1422. In the bias stage, the first sub light-emission controller 1421 is turned off, and the second sub light-emission controller 1422 is turned on. The initialization module 16 provides the bias signal Vobs to the first terminal of the driving transistor T0 through the second sub-light-emission controller 1422. The control terminals of the first light-emission controller 141 and the first sub light-emission controller 1421 are connected to a same light-emission control signal line EM1.

Figure 16:
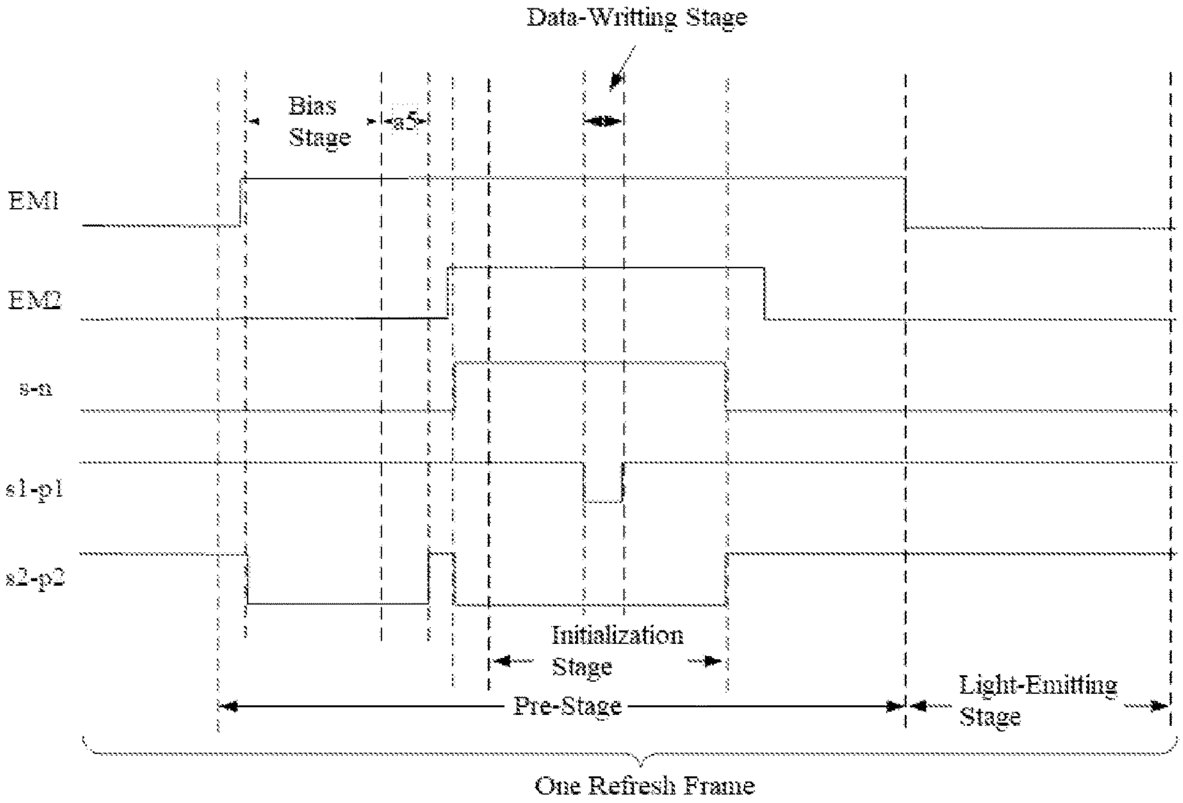
FIG. 16 illustrates an operational sequence diagram of the pixel circuit shown in FIG. 15, consistent with the disclosed embodiments of the present disclosure.
Figure 17:
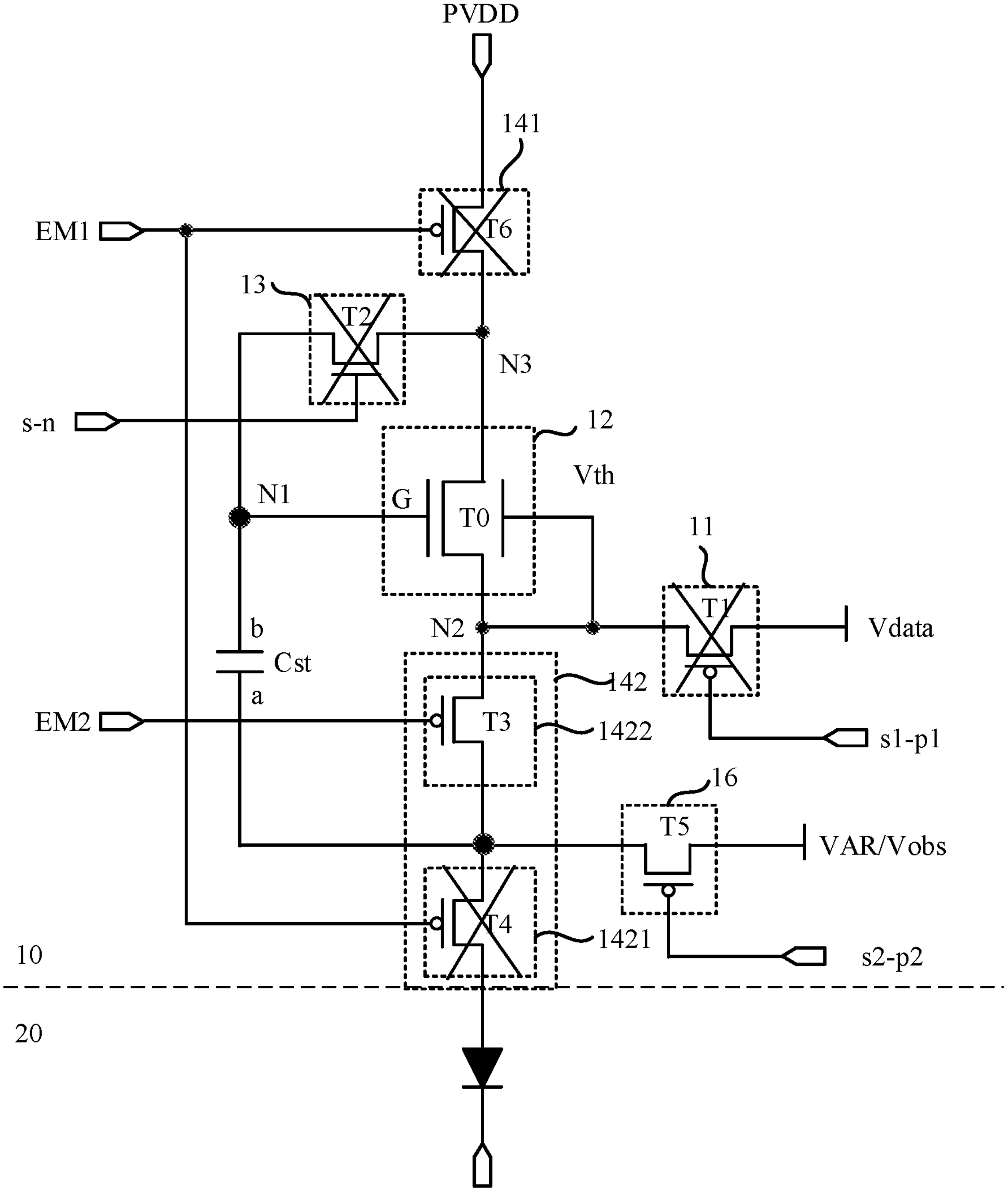
FIG. 17 illustrates an exemplary schematic diagram of a bias stage of the pixel circuit shown in FIG. 15, consistent with the disclosed embodiments of the present disclosure.

FIG. 16 illustrates an operational sequence diagram of the pixel circuit shown in FIG. 15. FIG. 17 illustrates an exemplary schematic diagram of a bias stage of the pixel circuit shown in FIG. 15. The operational process of the pixel circuit in the bias stage is be briefly introduced below with reference to FIGS. 15-17. In the bias stage, the first light-emission control signal EM1 is an invalid pulse, and the fourth transistor T4 and the sixth transistor T6 are turned off. The second light-emission control signal EM2 is an effective pulse, the third transistor T3 is turned on. The fourth scan signal s2-p2 is an effective pulse, and the fifth transistor T5 is turned on. At this time, the bias signal Vobs is written into the first terminal of the driving transistor T0, that is, the second node N2, through the fifth transistor T5 and the third transistor T3. Since the first node N1 is written with a data signal in a previous refresh frame, the potential of the first node N1 is substantially Vdata'+Vth. By setting the bias signal Vobs such that the voltage of the bias signal is smaller than the voltage of the first node N1, the conduction of the driving transistor may be achieved. Thus, the bias signal Vobs may be written into the second terminal, that is, the third node N3, such that the potential of the third node N3 may be smaller than the gate potential, and reverse bias of the driving transistor T0 may be realized. Thus, the increase in the threshold voltage of the driving transistor T0 in the unbiased stage may be balanced, that is, the threshold voltage of the driving transistor T0 in the bias stage may decrease. Accordingly, the Id-Vg curve may not drift, and display uniformity of the display panel may thus be improved.

With reference to FIG. 12 and FIG. 16, for the pixel circuit of the display panel shown in FIG. 10 and FIG. 15, within one time frame of the display panel, the operational process of the pixel circuit may include a pre-stage and the light-emitting stage. In at least one time frame, the pre-stage of the pixel circuit includes a bias stage.

In one embodiment, for a multi-frame image, in at least one time frame, the pre-stage of the pixel circuit is set to include a bias stage. In the bias stage, the bias signal is written into the driving transistor, such that the potential of the first terminal may be adjusted to change the bias state of the driving transistor. In a non-biased stage such as the light-emitting stage, the potential of the gate of the driving transistor may be greater than the potential of the source, and thus the threshold voltage of the driving transistor may drift. A bias stage may be added in at least one time frame of the pixel circuit, and the bias stage may at least partially balance the increase of the threshold voltage of the driving transistor in the non-bias stage. Accordingly, the display uniformity of the display panel may be improved.

In one embodiment, in the operational sequence of the pixel circuit shown in FIG. 10 and FIG. 15, the pre-stage includes a bias stage and a data-writing stage in sequence. At the end of the bias stage, the data-writing module 11 remains turned on, the compensation module 13 is turned on, and the pixel circuit 10 enters the data-writing stage. At this time, the bias stage may complete the adjustment of the bias state of the driving transistor, and the drift of the threshold voltage of the driving transistor may be balanced. On this basis, the pixel circuit 10 may be driven to perform the data-writing process. In the data-writing stage, the gate of the first transistor T1 receives an effective pulse signal of the second scan signal s1-p1 and turns on, that is, the data-writing module 11 is turned on. The gate of the second transistor T2 receives an effective pulse signal of the first scan signal s-n and turns on, that is, the compensation module 13 is turned on. The data signal Vdata at the data signal terminal is written into the gate of the driving transistor T0, that is, the first node N1, sequentially through the first transistor T1, the driving transistor T0, and the second transistor T2. This process is essentially a charging process of the storage capacitor Cst. With the threshold compensation of the second transistor T2, the potential of the first node N1 may decrease and remain at Vdata+Vth.

With continuous reference to FIG. 12 and FIG. 16, in an actual pixel driving process of the pixel circuit shown in FIG. 10 and FIG. 15, the pre-stage may be set to include a bias stage and a data-writing stage. At the end of the bias stage, the data-writing module 11 is turned off, the compensation module 13 remains turned off, and the pixel circuit 10 enters a fifth interval stage a5. After the fifth interval stage a5 ends, the data-writing module 11 and the compensation module 13 are turned on, and the pixel circuit 10 enters the data-writing stage.

In the fifth interval stage a5, the gate of the first transistor T1 receives an invalid pulse signal of the second scan signal s1-p1, and the data-writing module 11 is turned off. The drain of the driving transistor is disconnected from the data signal. The gate of the second transistor T2 receives an invalid pulse signal of the first scan signal s-n, and the compensation module 13 is turned off. At this time, the driving transistor may have a stable period. At the end of the fifth interval stage, the first scan signal s-n jumps from a low potential to a high potential, and the second scan signal s1-p1 jumps from a high potential to a low potential. The compensation module 13 and the data-writing module 11 are turned on, and the pixel circuit enters the data-writing stage. In this way, after the bias stage ends, a time margin is obtained through the fifth interval stage. Accordingly, the driving transistor may be stabilized, and when entering the data-writing stage, stability of display driving of the pixel circuit may be improved.

In one embodiment, a duration of the fifth interval stage may be set to be shorter than the duration of the bias stage, or the duration of the fifth interval stage may be shorter than the duration of the data-writing stage.

It may be understood that the data-writing stage is only used to write a data signal into the gate of the driving transistor. The fifth interval stage is a transition stage for stabilizing the driving transistor, and is only a time margin. The duration of the fifth interval stage may only include a duration of one reaction, and does not need to be too long. Accordingly, the duration of the fifth interval stage may be set to be shorter than the duration of the bias stage or the duration of the data-writing stage.

Figure 18:
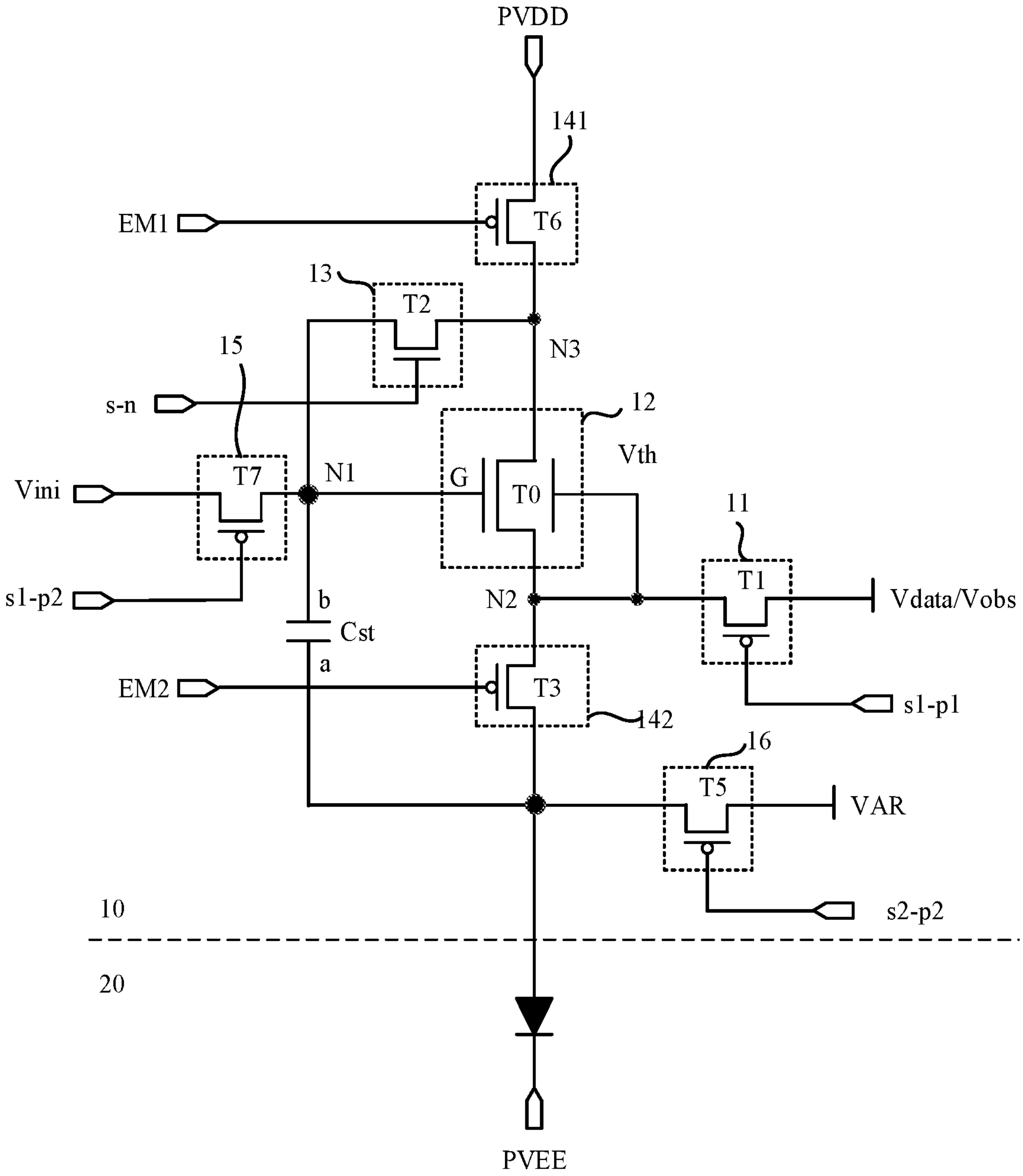
FIG. 18 illustrates a schematic structural diagram of another pixel circuit consistent with the disclosed embodiments of the present disclosure.
Figure 19:
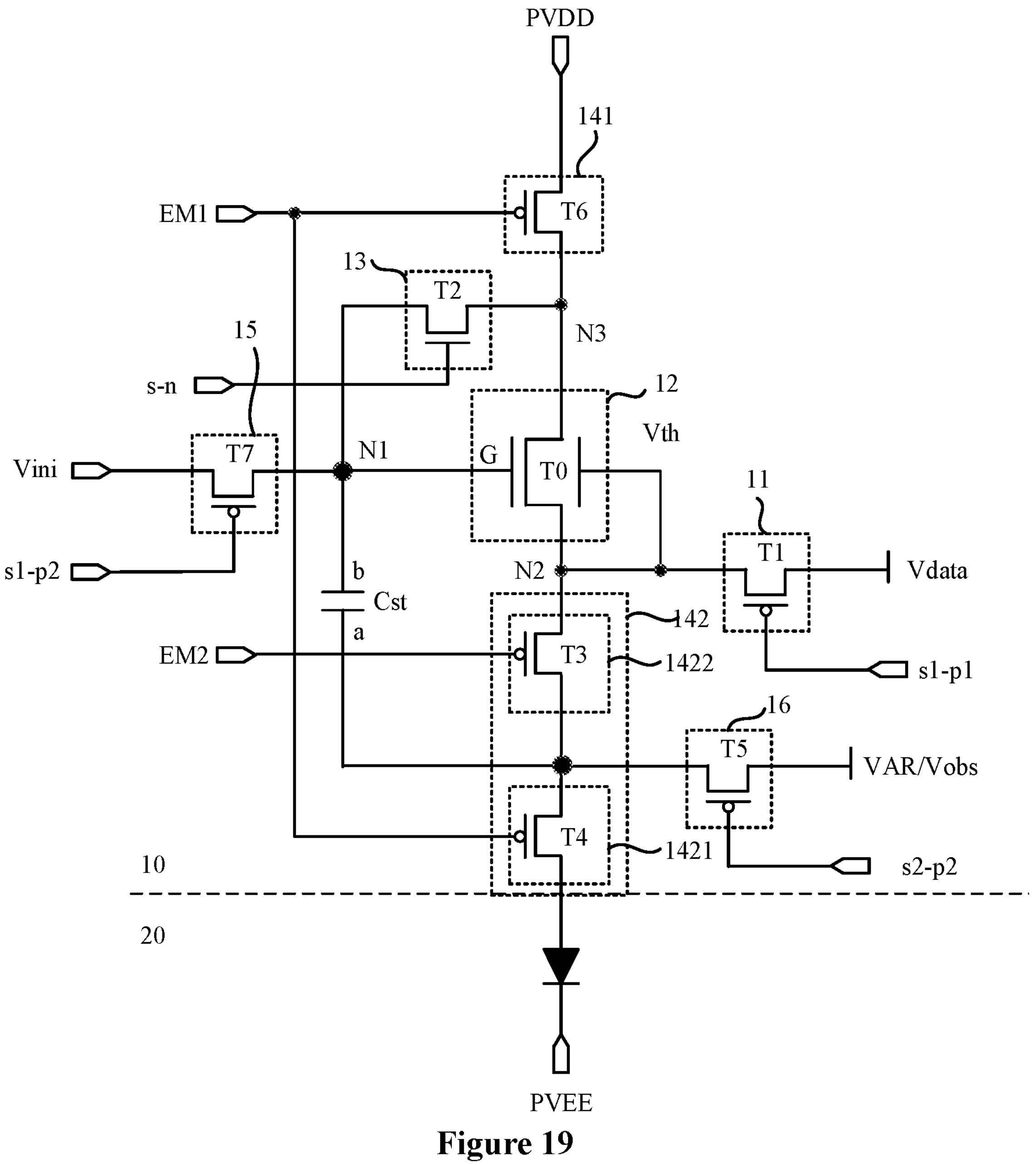
FIG. 19 illustrates a schematic structural diagram of another pixel circuit consistent with the disclosed embodiments of the present disclosure.

On the basis of the pixel circuits shown in FIG. 10 and FIG. 15, the present disclosure also provides two other pixel circuits. FIG. 18 and FIG. 19 illustrate schematic structural diagrams of two other pixel circuits. With reference with FIG. 18 and FIG. 19, the pixel circuit may also include a reset module 15. The reset module 15 is connected between a reset signal terminal Vini and the control terminal of the driving transistor T0, and is configured to provide a reset signal for the control terminal of the driving transistor T0. The reset module 15 may include a seventh transistor T7. The gate of the seventh transistor T7 receives a fifth scan signal s1-p2, and the fifth scan signal s1-p2 is a pulse signal. When the fifth scan signal s1-p2 is an effective pulse signal, the seventh transistor T7 is turned on. At this time, the reset signal terminal Vini writes a reset signal into the gate of the driving transistor T0.

Figure 20:
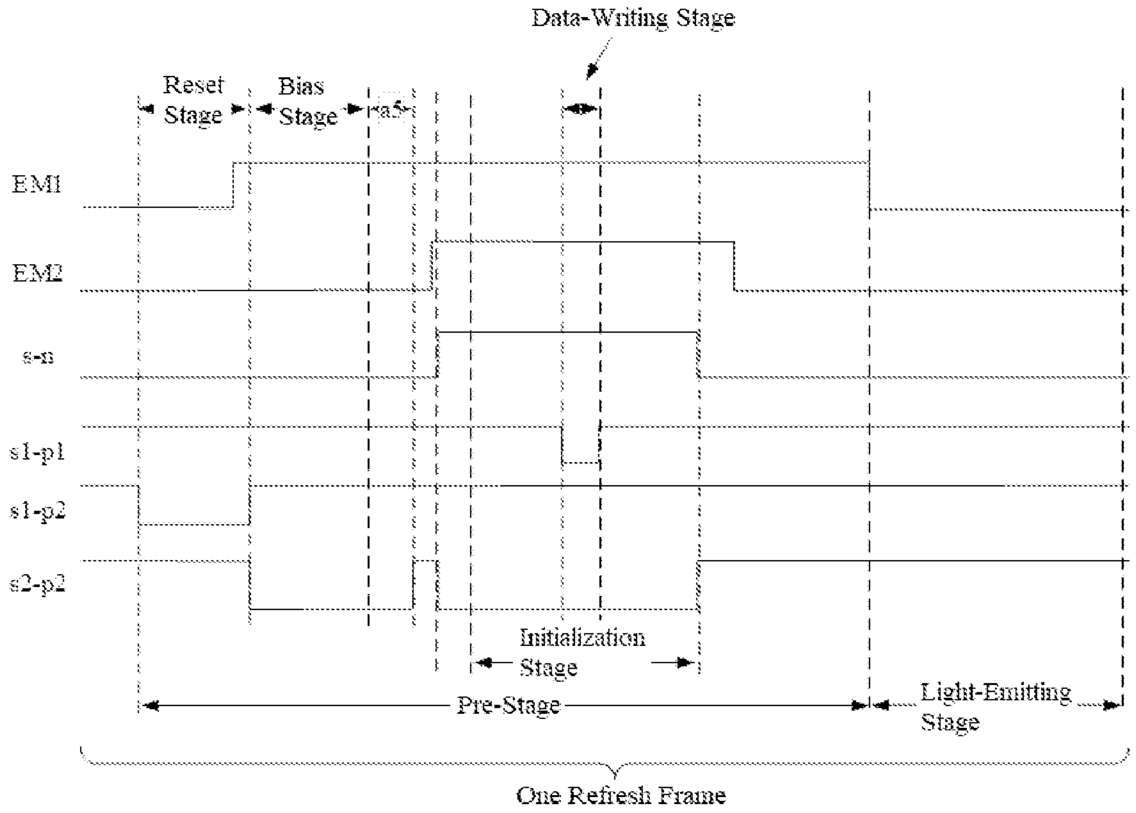
FIG. 20 illustrates an operational sequence diagram of the pixel circuit shown in FIG. 19, consistent with the disclosed embodiments of the present disclosure.

In one embodiment, the pre-stage may be set to include a reset stage and a bias stage. When the reset stage ends, the reset module is turned off. Meanwhile, the bias module is turned on, and the pixel circuit enters the bias stage. FIG. 20 illustrates an operational sequence diagram of the pixel circuit shown in FIG. 19. In one embodiment, with reference to FIG. 19 and FIG. 20, when the fifth scan signal s1-p2 is a valid pulse, that is, a low-potential signal, the pixel circuit enters the reset stage. After the reset stage ends, the fifth scan signal s1-p2 jumps to a high potential, and the reset module is turned off. Meanwhile, the fourth scan signal s2-p2 provides an effective pulse signal, that is, a low-potential signal, the bias module is turned on, and the pixel circuit enters the bias stage.

Figure 21:
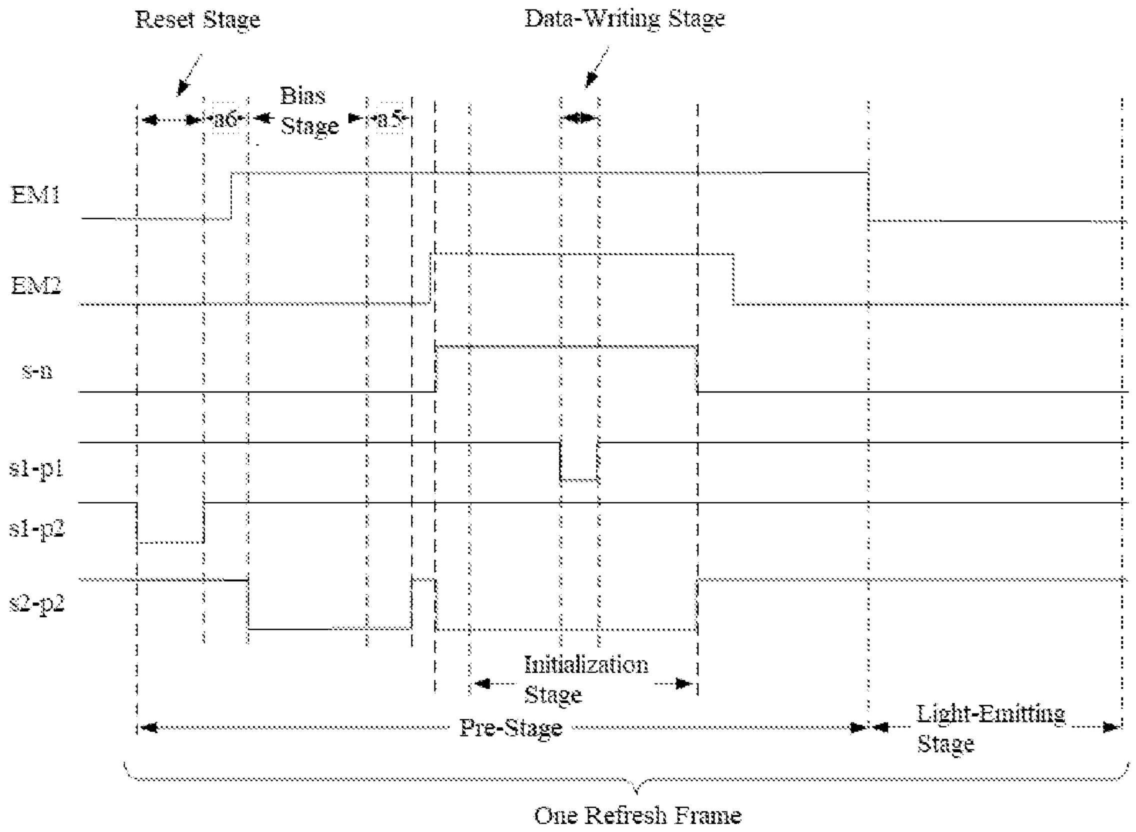
FIG. 21 illustrates another operational sequence diagram of the pixel circuit shown in FIG. 19, consistent with the disclosed embodiments of the present disclosure.

In one embodiment, the pre-stage of the pixel circuit may also be set to include a reset stage and a bias stage. At the end of the reset stage, the reset module is turned off, the data-writing module remains turned off, and the pixel circuit enters a sixth interval stage. After the sixth interval stage ends, the bias module is turned on, and the pixel circuit enters the bias stage. FIG. 21 illustrates another operational sequence diagram of the pixel circuit shown in FIG. 19. In one embodiment, as shown in FIG. 21, a sixth interval stage a6 may be set between the reset stage and the bias stage. Specifically, when the fifth scan signal s1-p2 is an effective pulse, that is, a low-potential signal, the pixel circuit enters the reset stage. After the reset stage ends, the fifth scan signal s1-p2 jumps to a high potential, and the reset module is turned off. At this time, the fourth scan signal s2-p2 is still an invalid pulse signal, that is, a high-potential signal, and the bias module remains off, that is, the pixel circuit enters the sixth interval stage a6. At the end of the sixth interval stage a6, the fourth scan signal s2-p2 provides an effective pulse signal, that is, a low-potential signal, the bias module is turned on, and the pixel circuit enters the bias stage. Similarly, the sixth interval stage a6 may be used to provide a time margin for the fifth scan signal s1-p2 to change from a low potential to a high potential to turn off the reset module, and meanwhile, also provide a time margin for the fourth scan signal s2-p2 to change from a high potential to a low potential to turn on the bias module.

It may be understood that the sixth interval stage is a transition stage for stabilizing the driving transistor, and is only a time margin. A duration of the sixth interval stage may only include a duration of one reaction, and does not need to be too long. Accordingly, the duration of the sixth interval stage may be set to be shorter than the duration of the bias stage or the duration of the data-writing stage.

Figure 22:
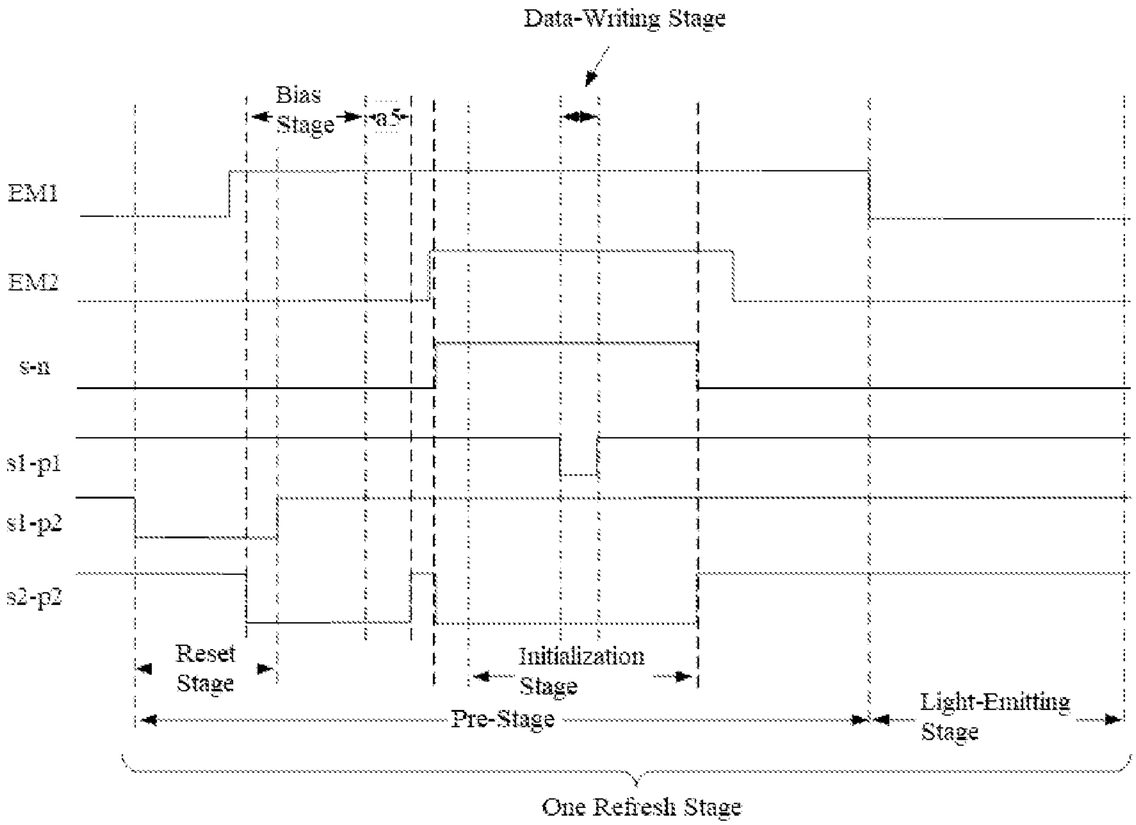
FIG. 22 illustrates another operational sequence diagram of the pixel circuit shown in FIG. 19, consistent with the disclosed embodiments of the present disclosure.

In addition, for a pixel circuit, to save the image refresh time of one frame, some stages may be arranged in a time sequence. The pre-stage may be set to include a reset stage and a bias stage. Durations of the reset stage and the bias stage at least partially overlap. FIG. 22 illustrates another operational sequence diagram of the pixel circuit shown in FIG. 19. With reference to FIG. 22, in one embodiment, the reset stage and the bias stage may partially overlap. Specifically, when the fifth scan signal s1-p2 is an effective pulse, that is, a low-potential signal, the pixel circuit enters the reset stage. Before the reset stage ends, that is, before the fifth scan signal s1-p2 changes from a low potential to a high potential, the fourth scan signal s2-p2 provides an effective pulse signal, that is, provides a low-potential signal. At this time, the bias module is turned on, and the pixel circuit enters the bias stage. Before the fourth scan signal s2-p2 provides an invalid pulse signal, that is, a high-potential signal, the fifth scan signal s1-p2 jumps to a high-potential signal, such that the reset module is turned off and the reset stage ends.

It may be understood that in the present disclosure, a position of the reset stage may be designed according to practical applications. Without affecting other stages of the pixel circuit, a position of the reset stage may be moved. It should be noted that the reset stage is used to reset the potential of the gate of the driving transistor T0, and the bias stage is used to adjust the potential of the first terminal or the second terminal of the driving transistor. To improve an effect of bias adjustment of the bias stage, in one embodiment, the reset stage may be set before the bias stage, or the pixel circuit may be set to enter the bias stage during the reset stage.

In one embodiment, to make the gate potential of the driving transistor T0 be the reset potential when data are written into the driving transistor, and to avoid changes in the gate potential of the driving transistor T0 during the bias stage, the bias stage may be set to end before the reset stage ends. It should be noted that, those skilled in the art may make settings according to practical needs and circuit operational processes.

Figure 23:
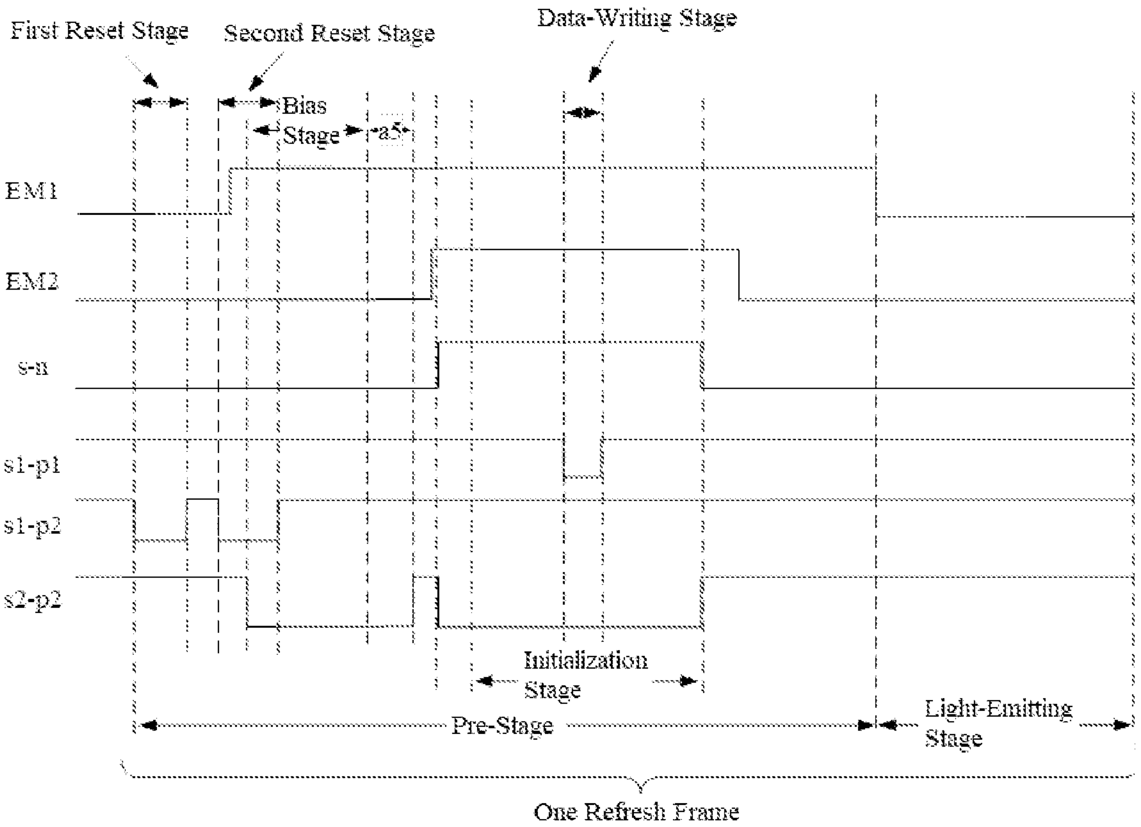
FIG. 23 illustrates another operational sequence diagram of the pixel circuit shown in FIG. 19, consistent with the disclosed embodiments of the present disclosure.

FIG. 23 illustrates another operational sequence diagram of the pixel circuit shown in FIG. 19. With reference to FIG. 19 and FIG. 23, in one embodiment, the reset stage may also be set to include a first reset stage and a second reset stage, and the second reset stage may partially overlap with the bias stage. In the first reset stage, the reset signal terminal provides a first reset signal for the control terminal of the driving transistor. In the second reset stage, the reset signal terminal provides a second reset signal for the control terminal of the driving transistor. The first reset signal is different from the second reset signal. It may be understood that since the first reset stage does not overlap with the bias stage, a purpose of the first reset stage is only to erase the data signal stored in the gate of the driving transistor T0 during a previous frame of time, that is, to reset the gate. The second reset stage overlaps with the bias stage, and a purpose of the second reset stage is to provide a potential signal for the gate of the driving transistor T0 in the bias stage. As such, in the bias stage, the bias module and the reset module may adjust the potentials of the gate, the first terminal and the second terminal of the driving transistor T0. Accordingly, the driving transistor T0 may be reversely biased, such that the drift of the threshold voltage of the driving transistor T0 in the unbiased stage may be balanced, and thus the stability of the threshold voltage of the driving transistor T0 may be improved. As a result, in the first reset stage and the second reset stage, different reset signals may be provided to the gate of the driving transistor T0 in a targeted manner, and thus the pixel circuit may be effectively reset and biased.

As shown in FIG. 18 and FIG. 19, the pixel circuit may include the reset module 15. However, to reduce the number of transistors and scanning signal lines in the pixel circuit and simplify the structure of the pixel circuit, the reset function may be realized by other transistors and scanning signals of the pixel circuit. Specifically, referring to FIG. 10 and FIG. 14, the first light-emission controller 141 and the compensation module 13 may be multiplexed as a reset module. In the reset stage, by controlling the first light-emission controller 141 and the compensation module 13 to be turned on, the first power signal PVDD may be written into the control terminal of the driving transistor T0. That is, the first light-emission control signal EM1 and the first scan signal s-n may be used to provide an effective pulse signal, such that the sixth transistor T6 and the second transistor T2 may be turned on, and the first power signal PVDD may be written to the first node N1. Thus, the first node N1 may be reset. On this basis, for the pixel circuit as shown in FIG. 10 and FIG. 14, the sequence of the reset stage and the bias stage may need to be set according to practical applications.

In one embodiment, with continuous reference to FIG. 12, for the pixel circuit shown in FIG. 10, the pre-stage includes a reset stage and a bias stage. At the end of the bias stage, the bias module is turned off. Meanwhile, the reset module is turned on, and the pixel circuit enters the bias stage. That is, the reset stage is after the bias stage. Specifically, in the reset stage, the first light-emission control signal EM1 and the first scan signal s-n provide effective pulse signals. The first light-emission control signal EM1 is a low-potential signal, and the first scan signal s-n is a high-potential signal, such that the sixth transistor T6 and the second transistor T2 may be turned on. Accordingly, the first power signal PVDD may be written into the first node N1, and the first node N1 may thus be reset. As such, the reset stage of the pixel circuit may be realized.

The present disclosure also provides a driving method of a display panel. The display panel includes a pixel circuit and a light-emitting element. The pixel circuit includes a data-writing module, a driving module, a compensation module, and a first light-emission controller. The driving module is configured to provide driving current for the light-emitting element. The driving module includes a driving transistor, and the driving transistor may be an NMOS transistor. The data-writing module is connected between a data-signal input terminal and a first terminal of the driving transistor for selectively providing a data signal for the driving module. The compensation module is configured to compensate the threshold voltage of the driving transistor. The first light-emission controller is connected between the first power signal terminal and the second terminal of the driving transistor for providing the first power signal to the driving module.

In one embodiment, the method for driving at least one image frame of the display panel includes:

S1: in the bias stage, the compensation module is turned off, the driving transistor receives a bias signal, and the bias signal is configured to adjust a bias state of the driving transistor.

In other embodiments, reference may be made to methods used in driving processes described in the present disclosure.

In one embodiment, for a pixel circuit of a display panel, an operational sequence of at least one image frame may include a bias stage. In the bias stage, the compensation module is turned off and the driving transistor receives the bias signal. The bias signal is configured to adjust the bias state of the driving transistor, and may drive the voltages of the gate, source or drain of the transistor. The operational sequence include at least one unbiased stage. When driving current is generated in the driving transistor, gate potential of the driving transistor may be greater than source potential of the driving transistor. As a result, the I-V curve of the driving transistor may drift, and the threshold voltage of the driving transistor may drift. In the bias stage, by adjusting the gate potential of the gate, source or drain of the driving transistor, and the deviation of the I-V curve of the driving transistor in the unbiased stage may be balanced. Accordingly, drift of the threshold voltage of the driving transistor may be reduced, and the display uniformity of the display panel may be improved.

In addition, the inventors found by research that, in a display process of an existing display panel, when displaying two different images, due to difference in image brightness, the image brightness may slowly change during a switching process. A brightness change process may take a long time and may be detected by human eyes. Accordingly, a problem of image flicker may appear, and an image display effect may be poor. The image flicker has become an urgent problem to be solved for improving quality of OLED display. The present disclosure also provides a driving method of the display panel. In the driving method of the display panel, the display panel may include a plurality of image refresh cycles during the driving and displaying process. At least one image refresh cycle includes a data-writing frame, a data-holding frame and a data-compensation frame. The data-compensation frame is located before the data-writing frame.

In the data-compensation frame, a gate scan signal may be provided to a pixel unit and a compensation data voltage may be written into the pixel unit. The compensation data voltage may be less than a target data voltage. The target data voltage is a theoretical data voltage corresponding to target brightness of a current image refresh cycle.

In the data-writing stage, a gate scan signal is provided to the pixel unit and the target data voltage is written into the pixel unit. In the data-holding frame, no data voltage is written into the pixel unit.

Each image refresh cycle may include a plurality of refresh frames, such as a data-compensation frame, a data-writing frame, or a data-holding frame. Each frame may drive the display panel to display an image. In one embodiment, in the first few frames, the display panel may be driven to display an image corresponding to the current image refresh cycle, and display of the image may be maintained in following frames. As an example, the duration of one image refresh cycle is one second (1 s), and the refresh frequency of the light-emission control signal Emit of the display panel is 60 Hz. The display panel maintains a same image display within 1 second, but the display panel may essentially refresh 60 identical images. That is, a one-second image refresh cycle may be evenly divided into 60 refresh frames, and the duration of each refresh frame is $1/60$ s. In the present disclosure, the duration of each refresh frame in an image refresh cycle may be different according to actual needs, and is not limited by the present disclosure.

Figure 24:
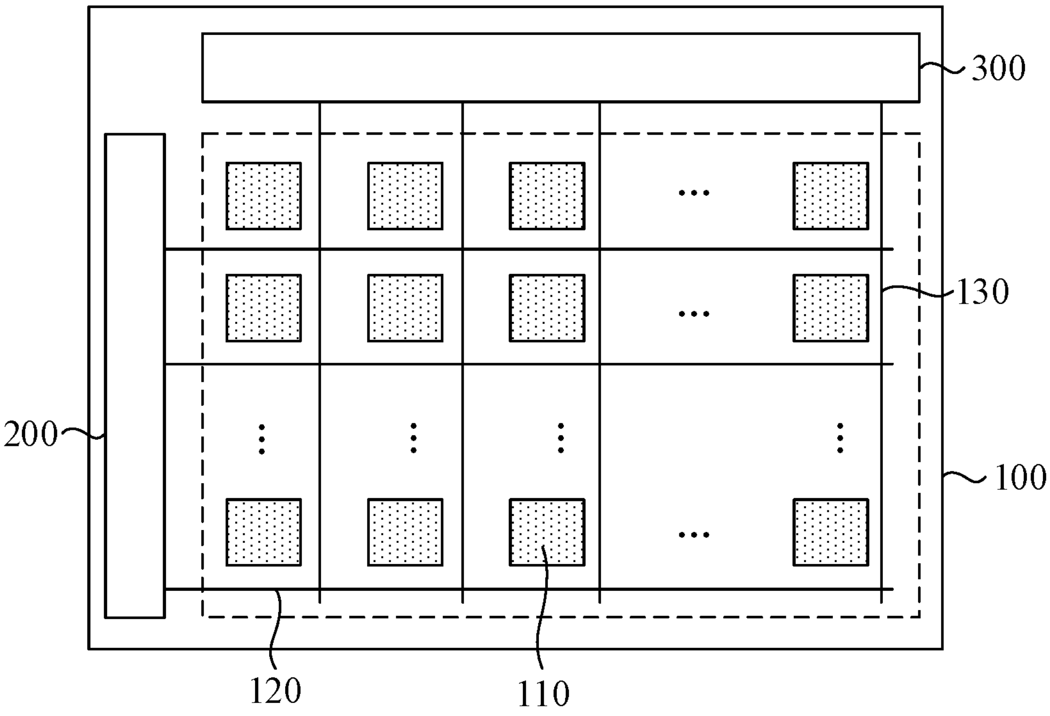
FIG. 24 illustrates a schematic structural diagram of a display device consistent with the disclosed embodiments of the present disclosure.
Figure 25:
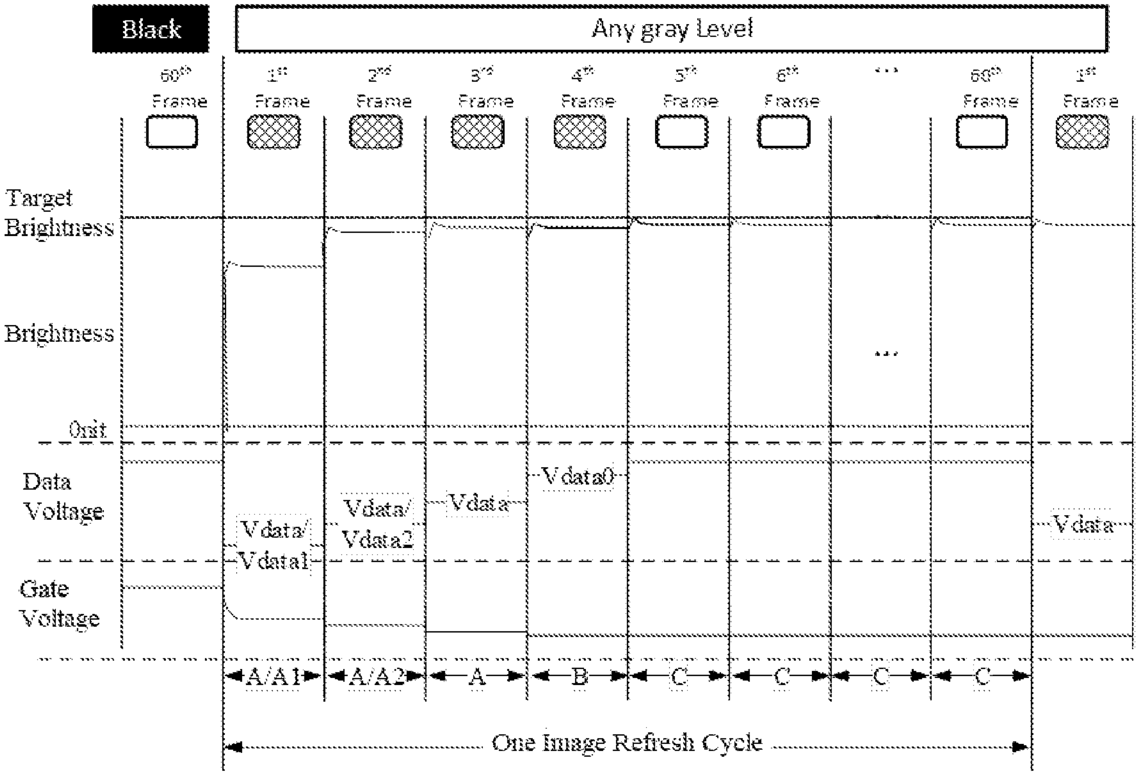
FIG. 25 illustrates a sequence diagram of a driving method for a display panel consistent with the disclosed embodiments of the present disclosure.

The image refresh cycle in the driving method provided by the present disclosure is specifically described below with reference to accompanying drawings. FIG. 24 illustrates a schematic structural diagram of a display device. FIG. 25 illustrates a sequence diagram of a driving method for a display panel. As shown in FIG. 24, the display device provided by the present disclosure specifically includes a display panel 100, and further includes a scan driving unit 200 and a data-writing unit 300. The display panel 100 includes a plurality of pixel units 110. The plurality of pixel units 110 are generally arranged in an array along a row direction and a column direction. Each pixel unit 110 may include pixel units of at least three prime colors: red pixel units, green pixel units, and blue pixel units. By matching colors with three primary colors of red, green and blue, a full-color image may be displayed. Specifically, a driving and light-emitting process of each pixel unit 110 is substantially implemented by a pixel circuit provided corresponding to each pixel unit 110 in the display panel 100.

In addition to the pixel units 110, the display panel also includes a plurality of gate scan lines 120 and a plurality of data signal lines 130. The pixel circuit is electrically connected to the gate scan line 120 and the data signal line 130, respectively. The pixel circuit may receive the gate scan signal provided by the scan driving unit 200 through the gate scan line 120, and may also receive the data voltage signal provided by the data-writing unit 300 through the data signal line 130. According to the gate scan signal and the data voltage signal, the pixel circuit may drive the pixel unit 110 to emit light. In the pixel circuit shown in FIG. 2, the gate scan line 120 is electrically connected to the second scan signal terminal s1-p1. The gate scan signal may be provided to the gate of the driving transistor T0 of the pixel circuit through the second scan signal terminal s1-p1, such that the pixel circuit may be turned on and off. The data signal line 130 is electrically connected to the data signal terminal Vdata. The data voltage may be written into the storage capacitor Cst through the data signal terminal Vdata, such that the light-emitting element 20, that is, the pixel unit 110, may be driven to emit light through the driving transistor T0.

In one embodiment, referring to FIG. 24 and FIG. 25, in the driving method of the display panel, in the data-compensation frame A, a gate scan signal may be provided to a pixel unit and a compensation data voltage may be written into the pixel unit 110. The compensation data voltage may be less than the target data voltage. The target data voltage is a theoretical data voltage corresponding to target brightness of the current image refresh cycle.

In one embodiment, the driving process of a display panel is essentially a process of driving a plurality of pixel units on the display panel, synchronously or one by one. When the display panel displays an image, each pixel unit 110 needs to be written with a corresponding data voltage to drive the pixel unit to emit light with corresponding brightness, thereby realizing the image display of the entire display panel. Thus, for each pixel unit 110 in the display panel, when writing a data voltage, the corresponding pixel unit 110 is sequentially turned on through the gate scan signal provided by the gate scan line 120, and the data voltage signal is written through the data signal line 130.

In other words, a data-writing frame includes sequential writing of data to a plurality of pixel units in cooperation with the scan lines. For the convenience of description, the above descriptions take a pixel unit as an example. A data-compensation frame and a data-holding frame may operate in a same principle as a data-writing frame, and are not be repeated here.

Referring to a plurality of data-compensation frames A in FIG. 25, the data-compensation frame is essentially a process of writing a compensation data voltage into a pixel unit. After the compensation data voltage is written in the process, the pixel unit is driven to display. But, the brightness of the pixel unit or the display panel may be affected by the hysteresis effect of the driving transistor in the pixel circuit. At this time, the brightness of the pixel unit or the display panel may be substantially different from the brightness theoretically corresponding to the compensation data voltage. For an OLED display panel, the brightness of the pixel unit is positively correlated with the current flowing through the driving transistor in the pixel circuit, and the current flowing through the driving transistor is inversely proportional to the data voltage written into the pixel unit.

In one embodiment of the present invention, in the data-compensation frame, the compensation data voltage written to the driving transistor may be less than the target data voltage, and theoretically the brightness of the pixel unit or the display panel may thus be greater than the target brightness of the current image refresh cycle. However, due to the hysteresis effect of the driving transistor of the pixel circuit, the compensation data voltage at this time may not make the brightness of the pixel unit greater than the target brightness of the current image refresh cycle. Instead, the brightness of the pixel unit, whose brightness may not reach the expected brightness due to the hysteresis effect, may be compensated, and the brightness of the pixel unit may even be equal to the target brightness. In other words, in the data-compensation frame, by writing a smaller compensation data voltage, higher screen brightness may be obtained. Moreover, since the image brightness in the compensation stage may be higher and closer to the target brightness, the time to reach the target brightness may be shortened. As such, in the image refresh cycle, before the target brightness is reached, the difference in brightness change may be relatively small, the brightness buffering time may be shortened, and thus the target brightness may be reached faster. Accordingly, the display effect of the image may be improved.

In one embodiment, in the data-writing frame, a gate scan signal may be provided to the pixel unit 110 and the target data voltage may be written into the pixel unit 110.

Referring to the data-writing frame B in FIG. 25, in a same image refresh cycle, the data-writing frame B is set after the data-compensation frame A. Through the data compensation process, the electrical performance of the driving transistor in the pixel circuit may tend to be stable, and the threshold voltage may reach the theoretical value. Therefore, at this stage, data-writing and display-driving may be performed according to the pixel circuit with stable electrical performance. At this stage, the theoretical data voltage corresponding to the target brightness of the current image refresh cycle may be written into the pixel unit. Through the normal driving of the pixel circuit, the pixel unit or the display panel may display at the target brightness.

It may be understood that the target data voltage in this stage may be a data voltage value within a certain range. For a display panel, the target brightness may be the brightness value within an allowable error range. The corresponding theoretical data voltage may also be a data voltage value within an allowable range. After the data voltage value within the allowable range is written, the brightness of the image displayed may reach the expected brightness range.

In one embodiment, in the data-holding frame, no data voltage is written to the pixel unit. Specifically, a gate scan signal may be provided to the pixel unit 110 without writing a data voltage signal. Referring to a plurality of data-holding frames C in FIG. 25, the plurality of data-holding frames is essentially an image holding stage. The data-holding frame is consistent with the data voltage of a previous stage. In the pixel circuit, the storage capacitor of the data-holding frame stores the data voltage of the previous stage, that is, the gate potential of the driving transistor maintains the data voltage of the previous stage. Accordingly, in the data-holding frame, there is no need to rewrite the data voltage, and the brightness is theoretically same as the brightness of the previous stage. As such, it may be understood that in one embodiment, the data-holding frame is set after the data-writing frame or the data-compensation frame. The data voltage written in the data-writing frame or the data-compensation frame may be stored in the capacitor of the pixel circuit, and the data voltage does not need to be rewritten in the data-holding frame. In a display refresh process of a pixel unit, by only providing a light-emission control signal, the pixel unit may be turned on and driven, such that the display panel may maintain an image.

It should be noted that, as shown in FIG. 25, the corresponding data voltage in the data-holding frame C is not a written data voltage, but is only a reference value of the data voltage. The reference value is configured to compare the compensation data voltage Vdata written in the data-compensation frame A and the target data voltage Vdata0 written in the data-writing frame B. In one embodiment, in the data-holding frame, a switch that controls the input of the data signal in the pixel circuit is turned off. Accordingly, regardless of the signal on the data signal line, no data signal may be input to the pixel circuit. In the data-holding frame, the data-writing module is in a closed state.

In the driving method of the display panel provided by the present disclosure, during the driving and displaying process, the display panel may include a plurality of image refresh cycles. At least one image refresh cycle includes a data-writing frame, a data-holding frame and a data-compensation frame. The data-compensation frame is set before the data-writing frame. In the data-compensation frame, a gate scan signal is provided to the pixel unit and a compensation data voltage is written into the pixel unit. The compensation data voltage may be less than a target data voltage. The target data voltage is a theoretical data voltage corresponding to a target brightness of a present image refresh cycle. In the data-writing frame, a gate scan signal is provided to the pixel unit and the target data voltage is written into the pixel unit. In the data-holding frame, no data voltage is written into the pixel unit, such that the display panel may realize the data compensation process in at least one image refresh cycle. Thus, the display brightness of the display panel may be quickly increased during the data compensation process.

The driving method of the display panel provided by the present disclosure may solve a problem of screen flicker caused by the hysteresis effect of the transistor, and make up for a defect of unstable electrical performance of the transistor. Accordingly, the target brightness of the present image refresh cycle may be reached quickly when images are switched, and the brightness difference of the images in a same screen refresh cycle may be reduced. Thus, the quality and effect of the image display may be improved. Moreover, since the compensation data voltage may be less than the target data voltage, input frequency of the data signal may be further decreased, and power consumption may thus be reduced.

It may be understood that, in the driving method provided by the present disclosure, a change pattern of the compensation data voltage may be set in the data-compensation frame. Exemplary compensation data voltages of data-compensation frames consistent with the present disclosure are given below.

In one embodiment, one image refresh cycle may include a plurality of data-compensation frames. The plurality of data-compensation frames may include a first data-compensation frame and a second data-compensation frame, and the first data-compensation frame is before the second data-compensation frame. The compensation data voltage written in the second data-compensation frame is greater than the compensation data voltage written in the first data-compensation frame.

In one embodiment, one image refresh cycle may include a plurality of data-compensation frames. The plurality of data-compensation frames may include a third data-compensation frame and a fourth data-compensation frame, and the third data-compensation frame is before the fourth data-compensation frame. The compensation data voltage written in the fourth data-compensation frame is equal to the compensation data voltage written in the third data-compensation frame.

In one embodiment, a plurality of image refresh cycles includes at least one first image refresh cycle and at least one second image refresh cycle. Brightness of the first image refresh cycle is greater than brightness of a previous image refresh cycle. The first image refresh cycle includes a data-writing frame, a data-holding frame and a data-compensation frame. Brightness of the second image refresh cycle is less than or equal to brightness of a previous image refresh cycle. The second image refresh cycle includes a data-writing frame and a data-holding frame.

In one embodiment, one image refresh cycle may include a plurality of data-compensation frames. Compensation data voltages correspondingly written in the plurality of data-compensation frames may be in arithmetic series, geometric series or exponential series.

It may be understood that in the driving method provided by the present disclosure, in an image refresh cycle, the position of the data-holding frame may be set according to practical applications. Exemplary implementations of the data-holding frame consistent with the present disclosure are given below.

In one embodiment, one image refresh cycle may include a plurality of data-compensation frames and a plurality of data-holding frames. At least two data-compensation frames are spaced by at least one data-holding frame.

In one embodiment, any two adjacent data-compensation frames are spaced by a same number of data-holding frames.

In one embodiment, the number of data-holding frames between two adjacent data-compensation frames increases.

The present disclosure also provides a display device including a display panel provided by the present disclosure. The display panel may be an organic light-emitting display panel or a micro LED display panel.

Figure 26:
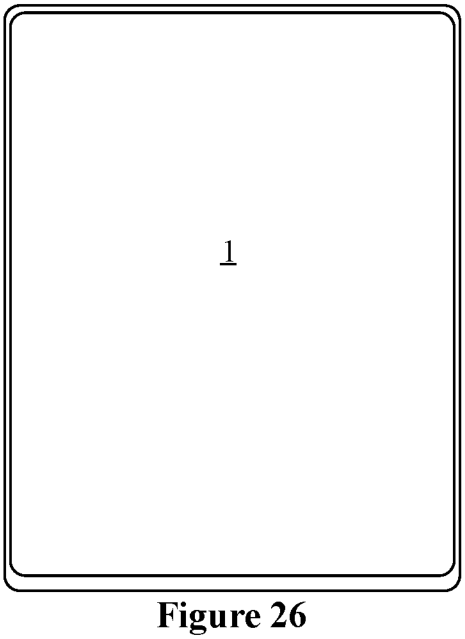
FIG. 26 illustrates a schematic diagram of a display device consistent with the disclosed embodiments of the present disclosure.

FIG. 26 illustrates a schematic diagram of a display device consistent with the disclosed embodiments of the present disclosure. Referring to FIG. 26, the display device may be applied to an electronic device 1, such as a smartphone or a tablet computer. It may be understood that the embodiments in the present disclosure only provide a part of exemplary structures of the pixel circuit and driving methods of the pixel circuit. The display panel also includes other structures, and these other structures are not detailed here.

As disclosed, the technical solutions of the present disclosure have the following advantages.

In the present disclosure, the operational process of the pixel circuit may include a bias stage. In the bias stage, the compensation module is turned off, and the driving transistor may receive a bias signal. The bias signal may be used to adjust the bias state of the driving transistor, and may drive the potentials of the gate, source or drain of the driving transistor. The operational process of the pixel circuit may include at least one non-bias stage. When driving current is generated in the driving transistor, the gate potential of the driving transistor may be greater than the source potential of the driving transistor. As a result, the I-V curve of the driving transistor may drift, and the threshold voltage of the driving transistor may shift. In the bias stage, by adjusting the potentials of the gate, source or drain of the driving transistor, the drift of the I-V curve of the driving transistor in the non-bias stage may be balanced. Accordingly, a phenomenon of threshold voltage drift of the driving transistor may be weakened, and the display uniformity of the display panel may be improved.

The embodiments disclosed herein are exemplary only and not limiting the scope of this disclosure. Various combinations, alternations, modifications, equivalents, or improvements to the technical solutions of the disclosed embodiments can be obvious to those skilled in the art. Without departing from the spirit and scope of this disclosure, such combinations, alternations, modifications, equivalents, or improvements to the disclosed embodiments are intended to be encompassed within the scope of the present disclosure.

What is claimed is:

1. A display panel, comprising a pixel circuit and a light-emitting element, wherein:

the pixel circuit includes a data-writing module, a driving module, and a compensation module;

the driving module is configured to provide a driving current for the light-emitting element, wherein the driving module includes a driving transistor, and the driving transistor is an NMOS transistor and is a double gate transistor that includes a first gate and a second gate, wherein the first gate is a control terminal of the driving transistor and the second gate is set to be electrically connected to an output terminal of the data-writing module;

the data-writing module is configured to selectively provide a data signal for the driving module; and the compensation module is configured to compensate a threshold voltage of the driving transistor;

wherein:

the data-writing module is multiplexed as a bias module;

in one image frame of the display panel, an operational process of the pixel circuit includes a pre-stage when the light-emitting element does not emit light and a light-emitting stage when the light-emitting element emits light, wherein the pre-stage includes a bias stage and a data-writing stage;

in the bias stage, the compensation module is turned off, the driving transistor receives a bias signal through the data-writing module, and the bias signal is configured to adjust a bias state of the driving transistor; and in the data-writing stage, the compensation module is turned on, and the driving transistor receives the data signal through the same data-writing module.

2. The display panel according to claim 1, wherein:

in the data-writing stage, a data signal input terminal connected to the data-writing module receives the data signal, and in the bias stage, the data signal input terminal receives the bias signal;

in the data-writing stage, each of the data-writing module, the driving module, and the compensation module is turned on, and the driving transistor receives the data signal; and in the bias stage, the compensation module is turned off, the data-writing module and the driving module are turned on, and the bias signal is written into the driving transistor.

3. The display panel according to claim 2, wherein:

the pixel circuit includes k rows of light-emitting elements;

during the operational process of the pixel circuit corresponding to the light-emitting element in an i-th row, in the bias stage, the data-writing module is turned on, and the bias signal written into a second terminal of the driving transistor is a present data signal on a data signal line connected to the data signal input terminal; and the present data signal is the data signal of the pixel circuit corresponding to the light- emitting element in a j-th row, written in the data-writing stage, wherein:

$k \geq 1$, $1 \leq i \leq k$, and $1 \leq j \leq k$.

4. The display panel according to claim 1, wherein:

at the end of the bias stage, the data-writing module remains turned on, the compensation module is turned on, and the pixel circuit enters the data-writing stage.

5. The display panel according to claim 1, wherein:

at the end of the bias stage, the data-writing module is turned off, and the pixel circuit enters a fifth interval stage; and at the end of the fifth interval stage, the data-writing module and compensation module both are turned on, and the pixel circuit enters the data-writing stage.

6. The display panel according to claim 5, wherein:

a duration of the fifth interval stage is shorter than a duration of the bias stage; or the duration of the fifth interval stage is shorter than a duration of the data-writing stage.

7. A method of driving a display panel, wherein:

the display panel includes a pixel circuit and a light-emitting element;

the pixel circuit includes a data-writing module, a driving module, and a compensation module;

the driving module is configured to provide a driving current for the light-emitting element, wherein the driving module includes a driving transistor, and the driving transistor is an NMOS transistor and is a double gate transistor that includes a first gate and a second gate, wherein the first gate is a control terminal of the driving transistor and the second gate is set to be electrically connected to an output terminal of the data-writing module;

the data-writing module is configured to selectively provide a data signal for the driving module; and the compensation module is configured to compensate a threshold voltage of the driving transistor;

wherein:

in one image frame of the display panel, an operational process of the pixel circuit includes a pre-stage when the light-emitting element does not emit light and a light-emitting stage when the light-emitting element emits light, wherein the pre-stage includes a bias stage and a data-writing stage;

in the bias stage, the compensation module is turned off, the driving transistor receives a bias signal through the data-writing module, and the bias signal is configured to adjust a bias state of the driving transistor; and in the data-writing stage, the compensation module is turned on, and the driving transistor receives the data signal through the same data-writing module.

* * * * *